(12) United States Patent  
Yanagisawa

(10) Patent No.: US 6,519,669 B1
(45) Date of Patent: Feb. 11, 2003

(54) APPARATUS AND METHOD OF CONNECTING A COMPUTER AND A PERIPHERAL DEVICE

(75) Inventor: Takashi Yanagisawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/419,375

(22) Filed: Oct. 15, 1999

(30) Foreign Application Priority Data

Oct. 16, 1998 (JP) .......................................... 10-295105

(51) Int. Cl.$^7$ ............................................... G06F 13/00
(52) U.S. Cl. ...................................................... 710/304
(58) Field of Search ................................ 710/301–304; 713/500, 502

(56) References Cited

U.S. PATENT DOCUMENTS

| | | | |
|---|---|---|---|
| 5,632,020 A | * | 5/1997 | Gephardt et al. ............ 710/107 |
| 5,781,744 A | * | 7/1998 | Johnson et al. ............... 710/15 |
| 5,884,049 A | * | 3/1999 | Atkinson .................... 361/687 |
| 5,889,964 A | * | 3/1999 | Cho et al. .................... 710/104 |
| 5,892,930 A | * | 4/1999 | Kenny et al. .................. 710/15 |
| 5,892,931 A | * | 4/1999 | Cohen et al ................. 710/303 |
| 5,901,292 A | * | 5/1999 | Nishigaki et al. ............ 710/304 |
| 5,999,997 A | * | 12/1999 | Pipes ........................... 710/10 |
| 6,098,132 A | * | 8/2000 | Olarig et al. ................ 710/302 |
| 6,154,796 A | * | 11/2000 | Lin et al. ..................... 710/119 |
| 6,161,157 A | * | 12/2000 | Tripathi et al. .............. 710/104 |
| 6,212,590 B1 | * | 4/2001 | Melo et al. .................. 710/107 |
| 6,216,185 B1 | * | 4/2001 | Chu ............................. 710/303 |

* cited by examiner

*Primary Examiner*—Paul R. Myers
(74) *Attorney, Agent, or Firm*—Douglas W. Cameron; Anne Vachon Dougherty

(57) ABSTRACT

The invention provides an apparatus and a method of hot docking/undocking a bus line and a peripheral device of a computer. The bus switch 60 connects and disconnects the bus lines 16a and 16b. The bus switch control circuit 61 generates on line 305–311 a bus switch control signal which responds to a turn around cycle from the signal on the bus line 16a and supplies it to the bus switch. The bus switch is operated to open/close in response to the bus switch control signal. Thus, the bus line 16a is in a turn around cycle in connecting/disconnecting the bus lines 16a and 16b so that the cycle operation of the bus is not affected by a noise accompanying opening/closure.

28 Claims, 14 Drawing Sheets

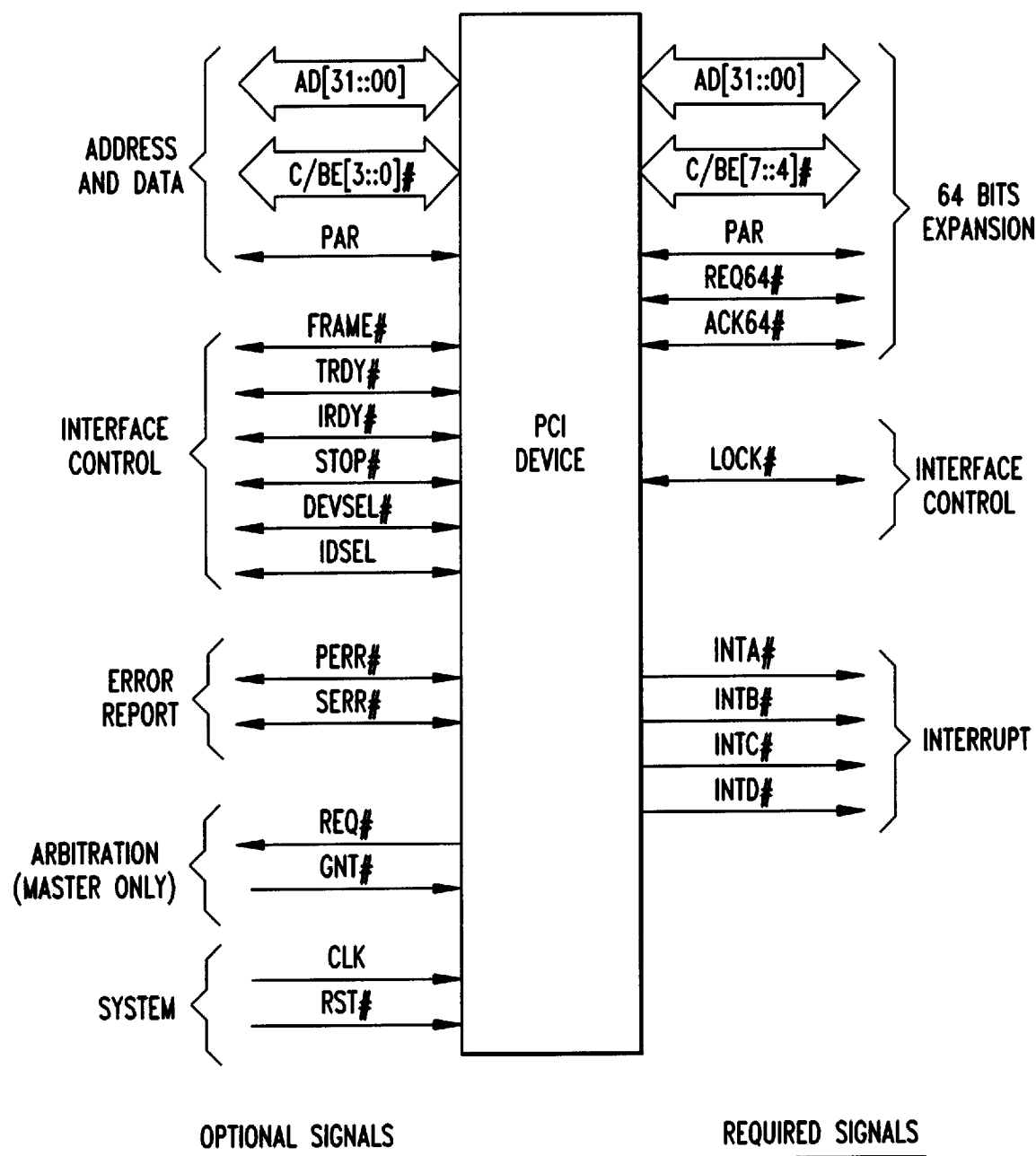

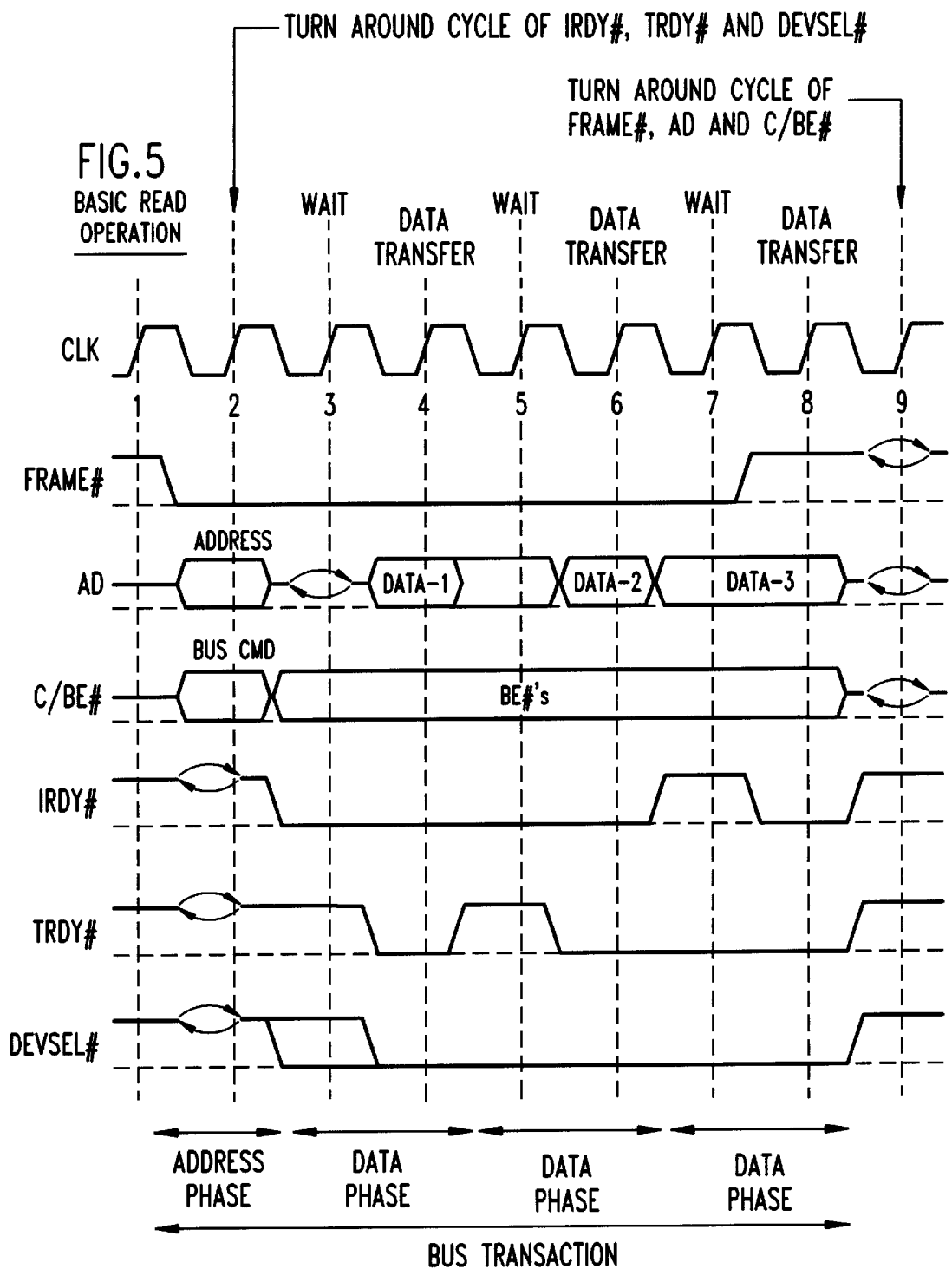

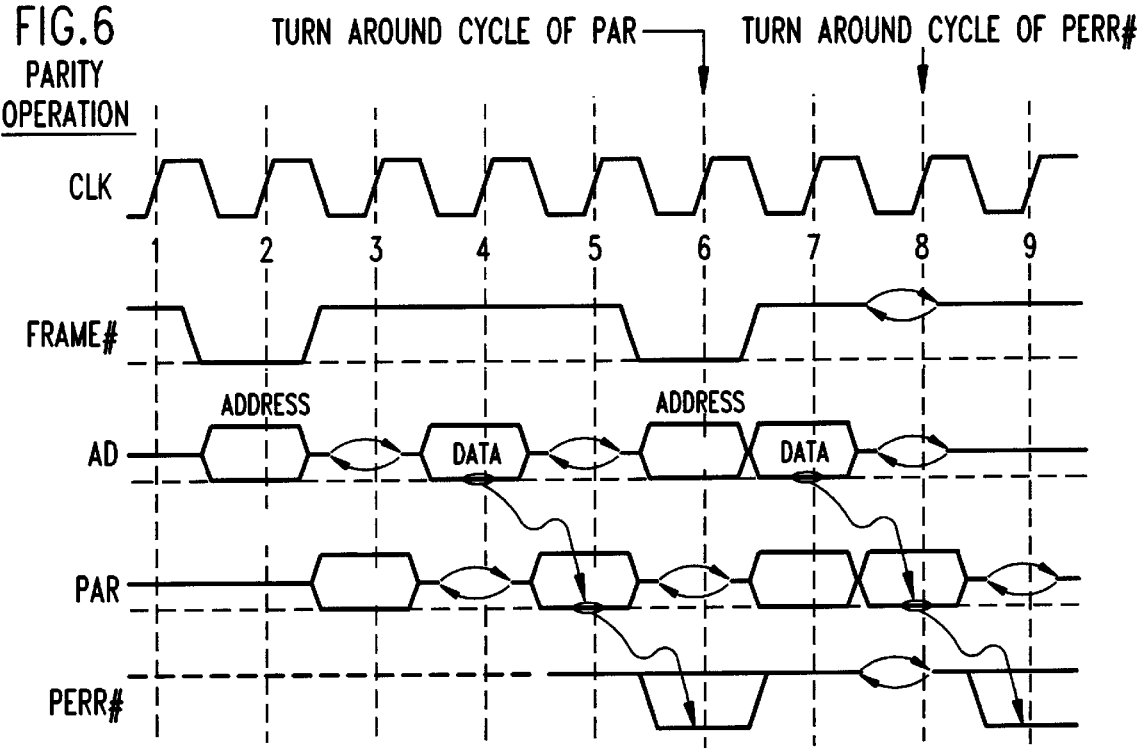
FIG. 6 PARITY OPERATION
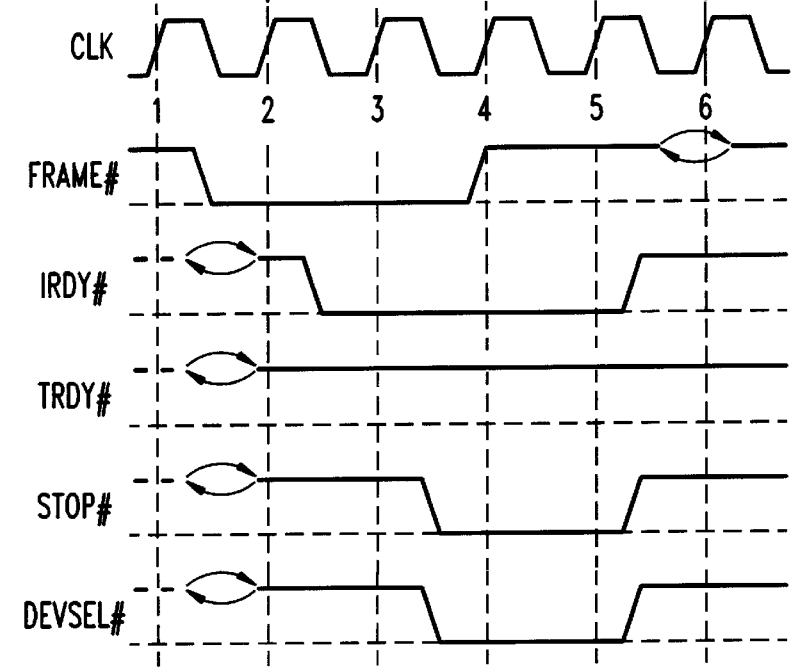
FIG. 8 RETRY

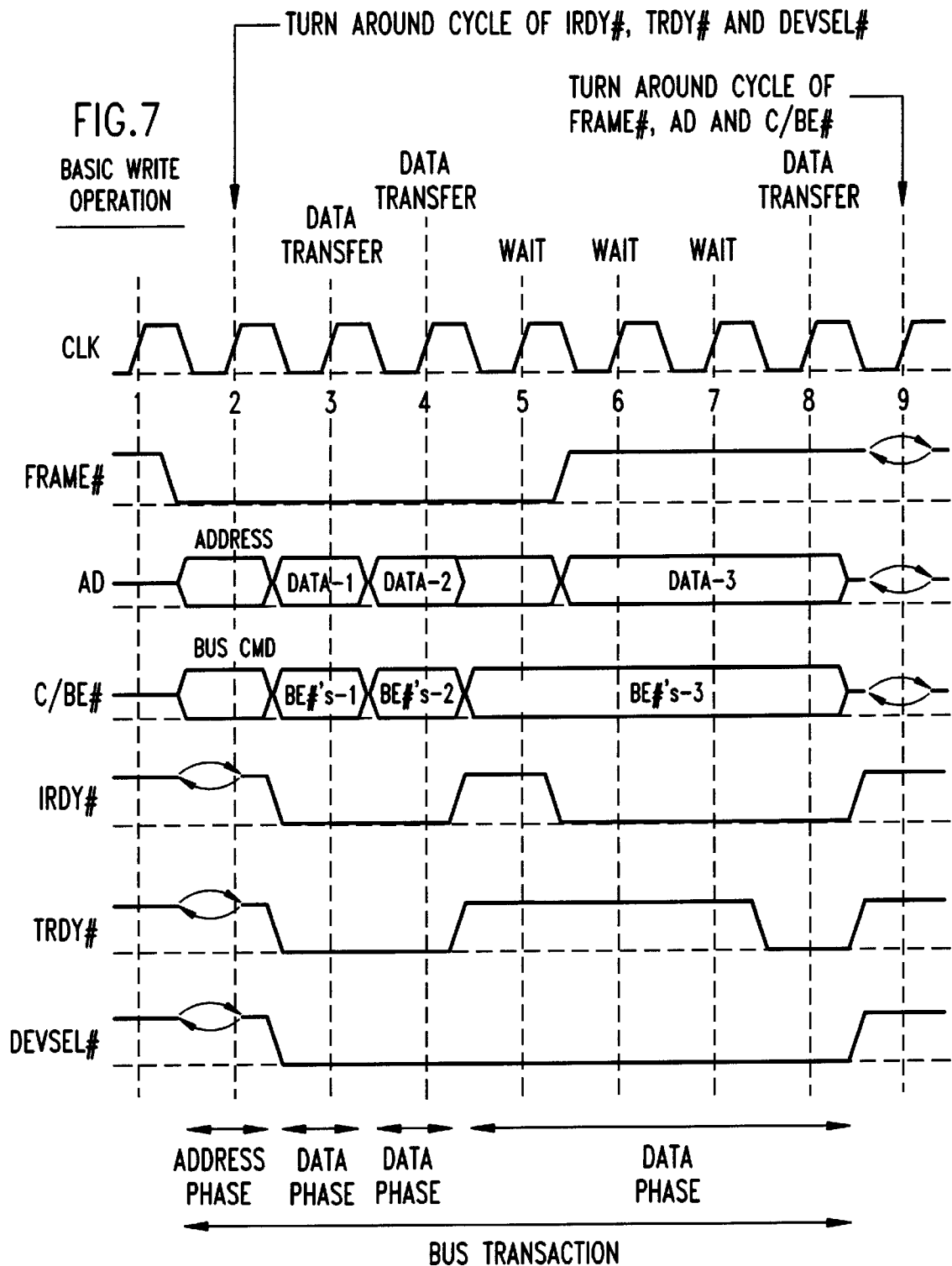

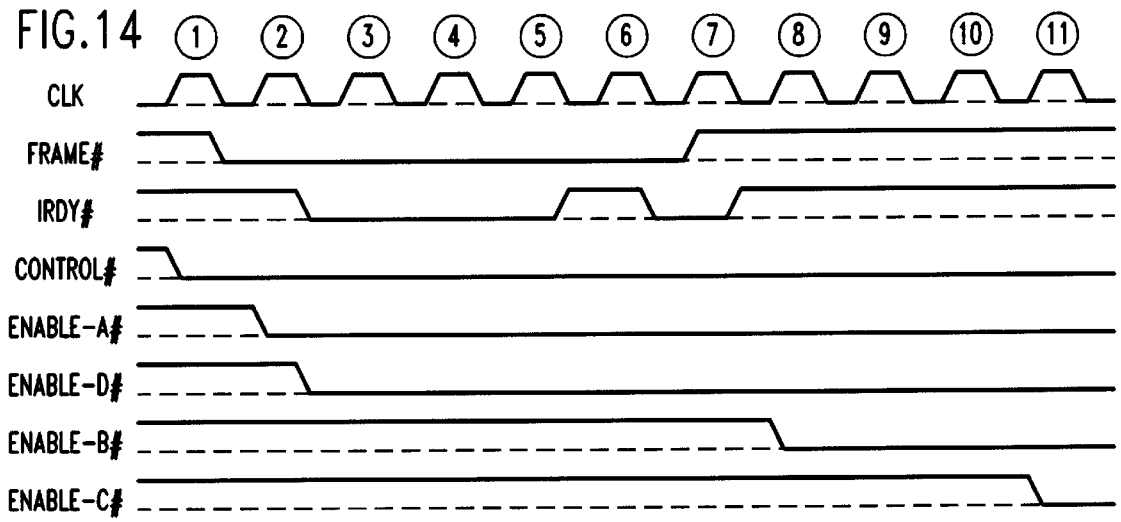
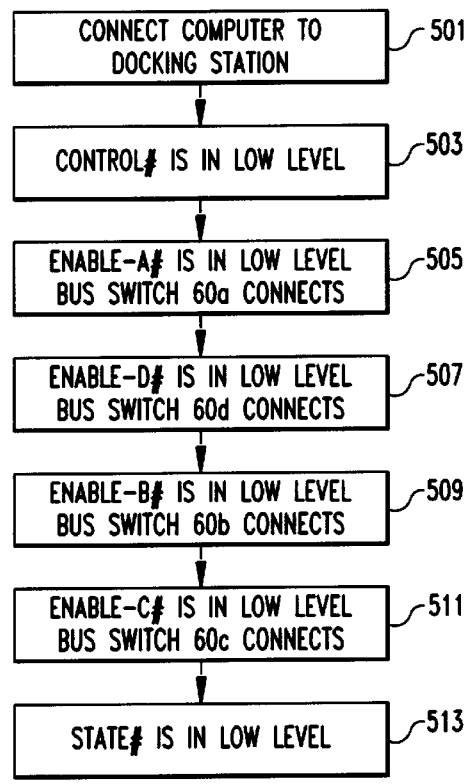

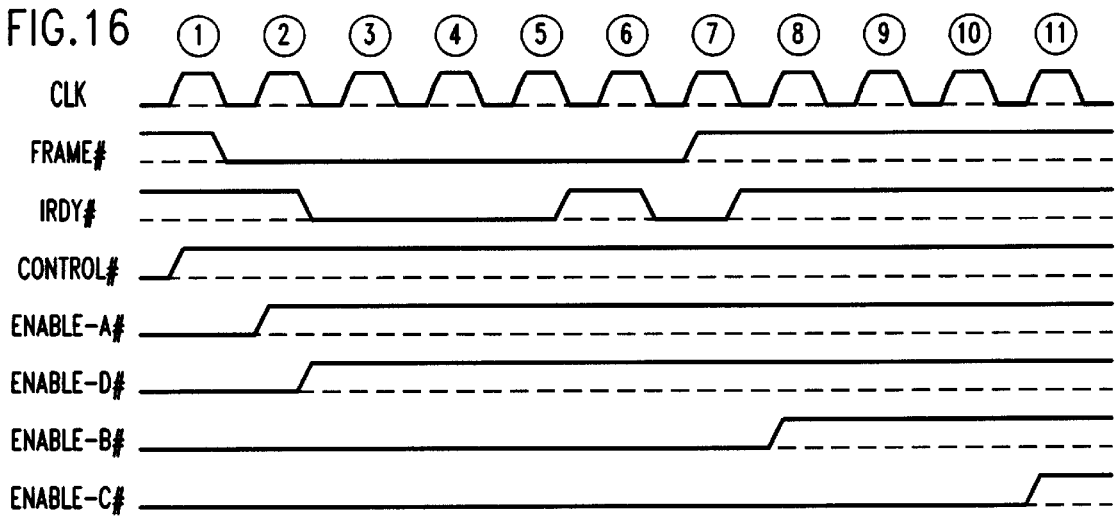
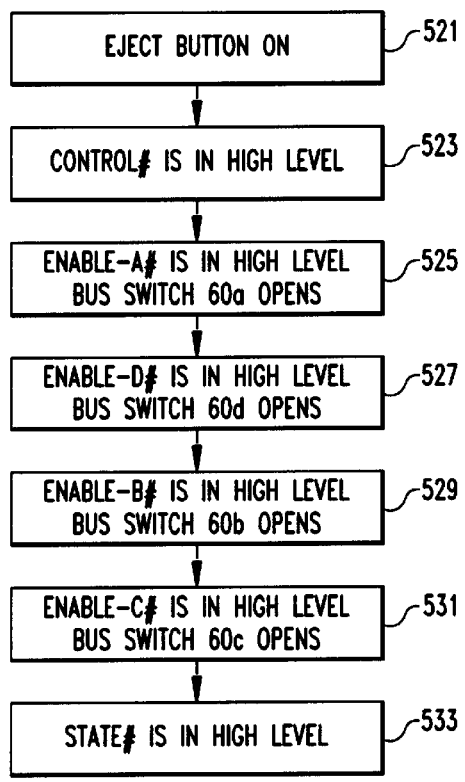

APPARATUS AND METHOD OF CONNECTING A COMPUTER AND A PERIPHERAL DEVICE

FIELD OF THE INVENTION

This invention relates generally to the connection of components in computer systems and more particularly to an apparatus and method for docking/undocking control for docking and undocking a peripheral device while a computer system is in operation without affecting the operation of a bus.

BACKGROUND OF THE INVENTION

In a personal computer system, a PCI (Peripheral Component Interconnect) bus, an ISA (Industry Standard Architecture) bus, an EISA (Extended Industry Standard Architecture) bus, and an MC (Micro Channel) bus, etc., are employed as paths of data transfer among devices such as various peripheral devices. Among them, the PCI bus was proposed by Intel Corporation in 1993 and recently replacing other buses with an extended bus of a type which allows relatively high speed data transfer by a burst mode (bus width 32/64 bits, maximum operation frequency 33/66 MHz, maximum data transfer rate 132/264 MBps). The details of the PCI bus are prescribed in the PCI Local Bus Specification Rev.2.1, PCI Special Interest Group publicized by Intel Corporation.

In a notebook type personal computer (hereinafter simply referred to as a "computer"), the size and the weight are restricted due to the importance of portability; and, it is not basically permitted to add an expansion board to a mother board to enhance functions as have been done conventionally. Accordingly, an expansion slot is provided on a panel surface of a computer housing to allow an adapter card having a RAM and communication function to be selectively attached. Further in order to use the computer alone when it is carried around and allow it to be used with a function approximately similar to a desk top computer when it is used in an office, a docking station is made available which is provided with a hard disk and an expansion slot and to which a computer unit is detachably mounted.

It is convenient for a user to connect and disconnect an adapter card and a docking station to and from a computer unit without interrupting the power source of the computer. However, because a bus line is normally shared by a plurality of devices, if a computer system is mounted to the docking station and one attempts to connect busses to each other without taking a bus cycle into consideration, the load of the bus line may abruptly change, generating a noise which may cause a malfunction of the bus cycle and a disruption of operation of the system.

In order to prevent this, a hot docking/undocking technology is developed for docking and undocking without interrupting the power source of a computer. PUPA 10-187304 discloses a technology of hot docking/undocking an operating computer to and from a docking station which does not support a hot docking/undocking interface. As shown in the schematic block diagram of FIG. 18, this technology provides a bus switch 617 in a PCI bus line 619 of a computer 611 and a DC bridge 623 on a PCI bus line 625 of a docking station 613. When it is detected that a computer is mounted to the docking station with the bus switch 617 being open, a PCI-ISA bridge 627, which is a bus master of the PCI bridge, acquires ownership of the bus and generates a dummy bus cycle such as an I/O read or I/O write on the PCI bus targeting a host-PCI bridge 629.

The host-PCI bridge 629 controls the bus switch 617 to close it while the PCI bus line 619 is in the dummy bus cycle state and to connect the PCI bus line 625 of the docking station to the PCI bus line 619. Because the dummy bus cycle is not used as a regular read/write, the operation of the computer is not affected even if the waveform of the bus cycle is disturbed at the time when the bus switch 617 is closed. However, it is necessary in this technology to provide a new PCI device which can acquire ownership of a bus for hot docking/undocking the PCI bus or to add such functionality to an existing PCI device. While it is known to provide a DS bridge 623 in the side of the docking station or the PCI-PCI bridge with a function of an initiator to generate a dummy bus cycle, this means that a special function is added to these bridges and will restrict selection of bridges.

"Thinkpad 76X, 77X", IBM notebook computer, (Thinkpad is a trademark of International Business Machines Corporation) provides a PCI-PCI bridge within the computer for hot docking/undocking the PCI bus line of the docking station to and from the PCI bus line of the computer. FIG. 19 shows a schematic block diagram showing this technology. In this technology, when a computer 631 is disconnected from a docking station 633 and operates alone, a PCI-PCI bridge 635 is in a disabled state and is not recognized by other devices on PCI bus 637. When the computer 631 is mounted to the docking station 633 while the computer is in operations the PCI bus line 637 is not affected by its bus cycle because the PCI-PCI bridge 635 disconnects the PCI bus line 637 from the PCI bus line 639. The docking station then invokes software to interrupt the computer and the BIOS which receives it enables the PCI-PCI bridge 635. However, because a signal, which is unique to devices and different from a signal which is common to the devices, exists in the signals of the PCI bus in this technology, the number of bus lines connected to the PCI-PCI bridge has to be increased in correspondence to the number of PCI devices on the docking station. Accordingly the number of bus lines passing a connector 641 increases if the PCI-PCI bridge is provided in the computer side and causes the expandability of the docking station to be impeded.

Further, PUPA8-6668 which was invented by the inventor of this patent application and assigned to the applicant of this patent application, discloses a technology in which a CPU monitors REFRESH# signal of the ISA bus to have the buses connected at the start time of a refresh cycle for hot docking/undocking. This technology takes advantage of an empiricism that the activity of the ISA bus is relatively low at the start time of the refresh cycle so that a signal waveform is not likely to be affected by coupling the buses.

Further, PUPA 5-73489 discloses a technology relating to hot docking/undocking of modules on a system bus to which a CPU and a plurality of modules are connected. In this technology, signals on the system bus are monitored by a bus cycle wait system in hot docking a device and the docked device does not receive data on the system bus when another device is transferring data on the system bus. Therefore, there is no likelihood that wrong data will be received and will incidentally match the receiving criteria of that device, putting the status of the end of receipt on a status bus. This technology grants a start permission to that device subject to a condition that data of other devices is not transferred on the system bus.

It is an object of this invention to provide an apparatus and a method of hot docking/undocking between a bus line, such as a PCI bus which interconnects devices of a computer system and peripheral devices of the computer, by adding a simple hardware to the computer.

It is another object of this invention to provide an apparatus and a method for monitoring a turn around cycle of a PCI bus line to hot dock/undock to and from a bus line at a time when noise will not affect a bus cycle when docked or undocked.

It is a further object of this invention to provide a connecting apparatus and method for hot docking/undocking in which there is no need to provide a device for acquiring the ownership of a bus for docking/undocking.

It is a further object of this invention to provide a connecting apparatus and method for hot docking/undocking in which there is no need to provide a PCI-PCI bridge in a computer for hot docking/undocking.

It is a further object of this invention to provide a connecting apparatus and method for hot docking/undocking which does not require a special function in a hot docked/undocked peripheral device.

SUMMARY OF THE INVENTION

The principle of this invention lies in focusing on the characteristic of signals in the cycle operation of a bus in connecting a bus or a device to another bus which is in a cycle operation. Specifically, a bus signal which is affected by a noise in hot docking/undocking has a turn around cycle in a cycle operation and the principle of this invention lies in interconnecting bus lines by taking advantage of the timing of the turn around cycle. While the turn around cycle is defined in the protocol of the PCI bus, this invention is not limited to hot docking/undocking of a PCI bus and may be applied to all buses which have a turn around cycle in the cycle operation.

In the PCI bus, because all bus cycles are basically in synchronism with CLK and the period of CLK is as short as 30 nanosecond (at 33 MHz operation), a consideration is made to prevent malfunctioning of the bus, due to a glitch and the like which is expected to occur in changing devices which drive the bus. Specifically, as a standard of a bus cycle, a timing in 1 clock interval which is changed by a device driving the bus, referred to as "turn around cycle", is prescribed. Each device is so prescribed as to neglect a signal level occurring on the bus at this timing. Therefore, if the PCI bus line of the peripheral devices is connected to the PCI bus line of the computer at the timing of the turn around cycle, no malfunctioning is brought to other PCI devices which are in cycle operation, even if a noise is generated on the bus line upon connection. The turn around cycle is required for every PCI signals which may be driven by 2 or more devices.

This invention provides, in one mode thereof, a connecting apparatus for electrically connecting a PCI bus line which interconnects devices comprising a computer system to peripheral devices of said computer, said apparatus comprising; a bus switch circuit for detecting a signal on said PCI bus line to generate a bus switch control signal which responds to a turn around cycle, and a switching device, inserted in a position to divide said PCI bus line into the side of said computer system and the side of said peripheral devices, said switching device having a bus switch responding to said bus switch control signal to perform a connect or disconnect operation. The connecting apparatus of this invention can be applied to any peripheral device which conforms to the PCI bus architecture such as a docking station, an adapter card and an I/O device, etc. In this mode, because the switching device is switched on or off in response to the turn around cycle by the bus switch control signal, the effect of a noise is avoided even if the buses are connected to each other during a cycle operation. The bus switch control circuit and the bus switch can be implemented by a relatively simple hardware configuration. Further, by providing the bus switch control circuit and the bus switch in the computer side, need of providing a special function for hot docking/undocking in the peripheral device side is obviated and the extent of devices which can be hot docked/undocked can be expanded.

In another mode of this invention, the bus switch control signal is generated in response to the turn around cycle related to the start of an address phase while, in further mode, it is generated in response to the turn around cycle related to an idle state. Because the timing when the turn around cycle is generated varies depending on the kind of a PCI signal, a bus line of various PCI signals can be hot docked/undocked by generating a bus switch control signal at each timing to control the switching device.

In further mode of this invention, the bus switch control signal detects the turn around cycle from each of FRAME#, IRDY#, and CLK signals. Because the turn around cycle of a necessary PCI signal can be detected by monitoring only these 3 signals, a simple bus connecting device can be implemented.

BRIEF DESCRIPTION OF THE DRAWINGS

The invention will now be described in greater detail with specific reference to the appended drawings wherein:

FIG. 4 is a signal list of the PCI bus used in this invention;

FIG. 5 is a diagram showing a basic read operation of the PCI bus;

FIG. 6 is a diagram showing a parity operation of the PCI bus;

FIG. 7 is a diagram showing a basic write operation of the PCI bus;

FIG. 8 is a diagram showing a basic retry operation of the PCI bus;

FIG. 14 is a diagram showing an example of a timing chart of a PCI signal at the time of hot docking;

FIG. 15 is a diagram showing an example of a flow chart of a connection procedure at the time of hot docking;

FIG. 16 is a diagram showing an example of a timing chart of a PCI signal at the time of hot undocking;

FIG. 17 is a diagram showing an example of a flow chart of a connection procedure at the time of hot undocking;

DETAILED DESCRIPTION OF THE INVENTION

Figure 1:
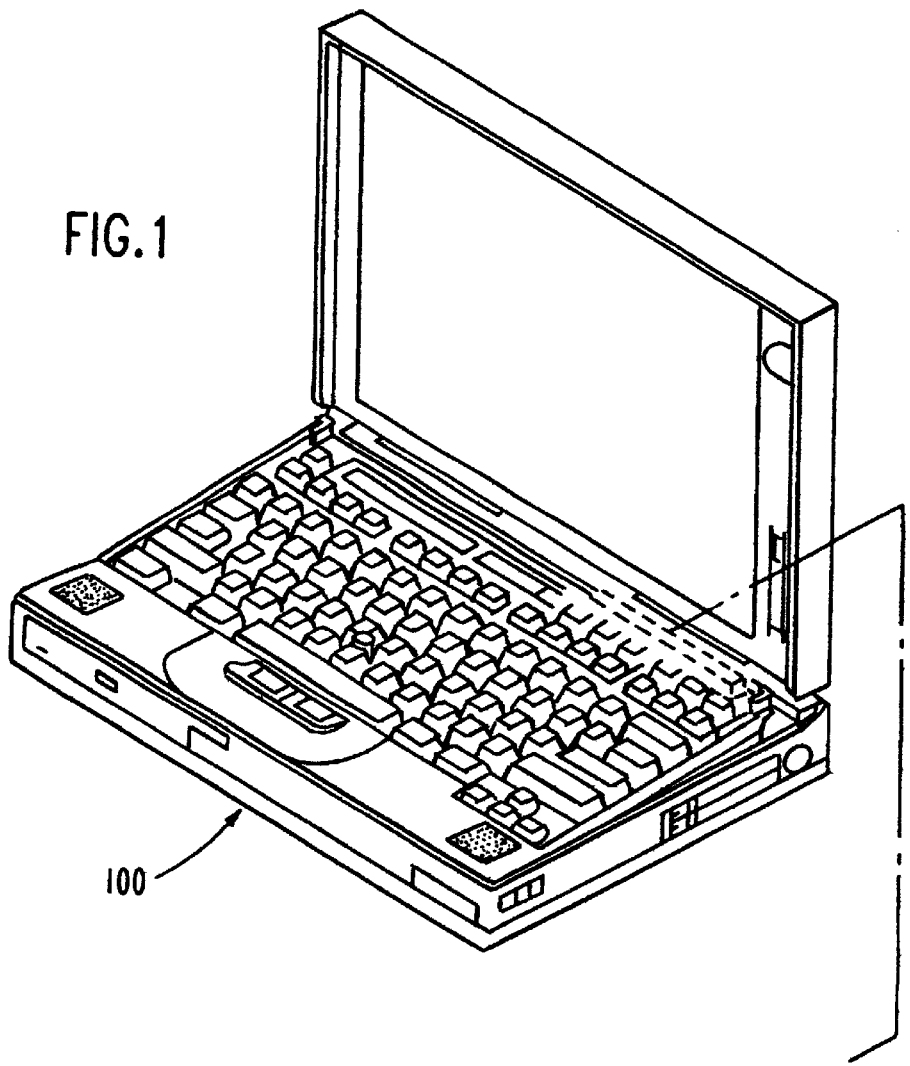
FIG. 1 is a diagram showing an external appearance of a personal computer of a notebook type to which this invention is suitably applied and a docking station.
Figure 2:
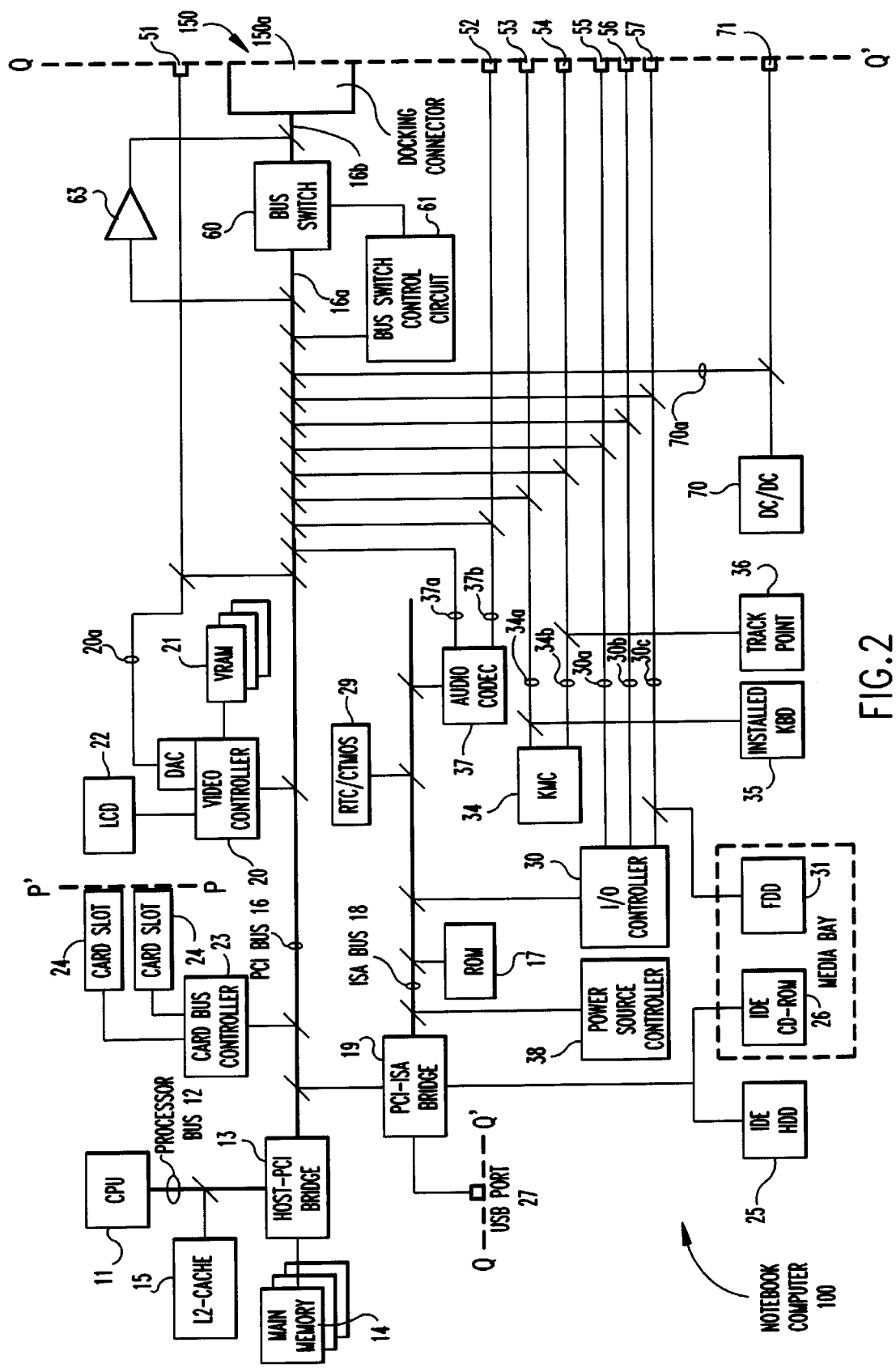
FIG. 2 is a schematic block diagram of a personal computer.

FIG. 1 shows a personal computer 100 of a notebook type to which this invention is suitably applied (hereinafter referred to as a "computer") and a docking station 200 which expands the function of the computer. The computer 100 is provided with a connector 150b in the back of the unit for electrical connection to the docking station. FIG. 2 is a schematic block diagram showing a hardware configuration of the computer 100. Same reference numbers are assigned to components of same functions in the drawings attached to this specification. A CPU 11 which is a main controller executes programs under the control of an OS (Operating System). The CPU 11 is interconnected to hardware components to be described later via buses of 3 hierarchies including: a processor bus 12 directly connected its own external pins, a PCI bus 16 as a local bus, and an ISA (Industry Standard Architecture) bus 18 as an input/output bus.

The processor bus 12 and the PCI bus 16 communicate with each other by a host-PCI bridge 13. The bridge 13 of this embodiment is of a configuration which includes a memory controller for controlling an access operation to a main memory 14 and a data buffer for absorbing the difference of data transfer speeds between the buses 12 and 16. The main memory 14 is a writable memory used as a reading area of a program to be executed by the CPU 11 or a working area to which data processed by an execution program is written. The "execution program" as used here includes an OS such as Windows98, device drivers for operating the hardware aspect of peripheral devices, an application program designed for a specific job, and a firmware stored in a ROM 17 (to be described later).

An L2 (level 2) cache 15 is a high speed operation memory for absorbing a time for the CPU 11 to access the main memory 14 and is adapted to temporarily store limited codes and data which the CPU 11 frequently accesses. Relatively fast driving PCI devices, such as a video controller 20 and a card bus controller 23, are connected to the PCI bus 16. The video controller 20 is a special purpose controller for actually processing a rendering instruction from the CPU 11, which temporarily writes processed rendering information in a video memory (VRAM) 21 and reads rendering information from the VRAM 21 to output it as rendering data to a liquid crystal display (LCD) 22. The video controller 20 can also convert a video signal to an analog signal by a digital-analog converter (DAC) installed therein. The analog video signal is outputted to a CRT port 51 via a bus line 20a. The bus line 20a branches in the middle to a docking connector 150 too. The card bus controller 23 is a special purpose controller for directly coupling a bus signal on the PCI bus 16 to an interface connector (card bus) of a PCI card slot 24. The card slot 24 is adapted to receive a PC card (not shown) conforming to the specification (PC Card Standard 95, for example) prescribed by PCMCIA (Personal Computer Card International Association)/(JEIDA (Japan Electronic Industry Development Association).

A bus switch 60 for hot docking/undocking the PCI bus 16, a buffer 63 and a bus switch control circuit 61 are provided in the PCI bus 16. The bus switch 60 is a switch for interconnecting or disconnecting the PCI bus 16a in the internal system side to and from a PCI bus 16b in the docking connector 150a side. The PCI bus 16b communicates with a PCI bus internal to the docking station 200 which is connected by the docking connector 150. The buffer 63 is inserted in a bus line for sending an RST# signal from the computer side to the docking station side and independent from the operation of the bus switch 60. The bus switch control circuit 61 monitors the cycle operation of the PCI bus 16 and generates a bus switch control signal to control the operation of the bus switch 60. The detail of the bus switch 60 and the bus switch control circuit 61 will be described later.

The PCI bus 16 and the ISA bus 18 are interconnected to each other by a PCI-ISA bridge 19. The bridge 19 is provided with an IDE (Integrated Drive Electronics) interface for connecting with an external storage device conforming to IDE. An IDE hard disk drive (HDD) 25 is connected to the IDE interface while an IDE CD-ROM drive 26 is ATAPI (AT Attachment Packet Interface) connected to the IDE interface. The bridge circuit 19 has installed therein a USB route controller for connecting with a USB (Universal Serial Bus) which is a general purpose bus and is provided with a USB port 27. ISA bus 18 is a bus having a relatively low data transfer rate in comparison to the PCI bus 16 (bus width; 16 bits, maximum data transfer rate; 4 MBps) and which is used to connect relatively low speed driving peripheral devices such as an ROM 17, a real time clock (RTC) 29, an I/O controller 30, a keyboard/mouse controller 34 and an audio CODEC 37, etc.

The ROM 17 is a nonvolatile memory for permanently store codes (BIOS; Basic Input/Output System) for controlling an input/output operation of hardwares such as a keyboard 35, a floppy disk drive (FDD) 31, and a firmware such as a self diagnosing test program (POST; Power On Self Test) operating upon powering up of the system. A power source controller 38 is a peripheral controller provided mainly for managing power supply to portions in the system and has a RAM, a ROM and a timer installed therein in addition to a microprocessor. Further in this embodiment, the power controller 38 generates a software interruption named SMI (System Management Interrupt) in response to a signal relating to mechanical connection between the computer and the docking station and an eject signal for ejecting the computer from the docking station and, then, sends a signal for hot docking/undocking to the bus switch control circuit 61 according to an indication by the BIOS. The real time clock (RTC) 29 is a device for measuring current time.

The I/O controller 30 is a peripheral controller for controlling activation of the floppy disk drive (FDD) 31, an input/output of parallel data (PIO) via a parallel port 55, and an input/output of serial data (SIO) via a serial port 56. A printer is connected to the parallel port while a modem is connected to the serial port, for example. A parallel bus line 30a extends to the parallel port 55 and branches to the docking connector 150 too. Also, the serial bus line 30b extends to the serial port 56 and branches to the docking connector 150. The bus line 30c for the FDD 31 extends to an external FDD port 57 and branches to the docking connector 150 too.

The keyboard/mouse controller (KMC) 34 is a peripheral controller for inputting an input scan code from the keyboard 35 and a coordinate value indicated by a track point 36 as computer data. A bus line 34a for the keyboard and a bus line 34b for the mouse extend to an external keyboard port 53 and an external mouse port 54, respectively, and branch to the docking connector 150 too. The audio CODEC 37 is a special purpose controller for input and output of an audio signal and includes a CODEC circuit (COder-DECoder: i.e., an AD, DA converter provided with a mixing function) for digital recording and play back of the audio signal. A MIDI bus line 37a is allocated to a part of the docking connector 150. An audio output bus line 37b extends to a line output terminal 52 and branches to the docking connector 150 too.

A DC inlet 71 is a jack for attaching an AC adapter for converting an external AC power source to a DC voltage. A DC/DC converter 70 is adapted to step down and stabilize the external power source voltage received via the DC inlet 71 or the docking connector 150 to feed portions in the computer 100. When a power is supplied from the docking station 200 side, it is inputted to the DC/DC converter 70 via a power line 70a.

As shown in the drawing, bus signals of the PCI bus 16 and the ISA bus 18, other port signals 20a, 30a, 30b, . . . , and the power line 70a are allocated to the pins of the docking connector 150. The docking connector 150a matches a docking connector 150b on the docking station 200 side in electrical and mechanical specifications. By connecting the computer 100 and the docking station 200 using the connector 150, the PCI bus 16 and other port signals 20a, 30a, 30b, . . . of the computer 100 unit side are developed in the expansion unit 200 side. The computer 100 joins the expansion unit 200 at the docking connector 150 in the back thereof. Incidentally, many other electrical circuits are required than those shown in FIG. 1 for configuring the computer system 100. However, they are omitted in this specification because they are well known to those skilled in the art and do not constitute the gist of this invention.

Hardware Configuration of Docking Station

Figure 3:
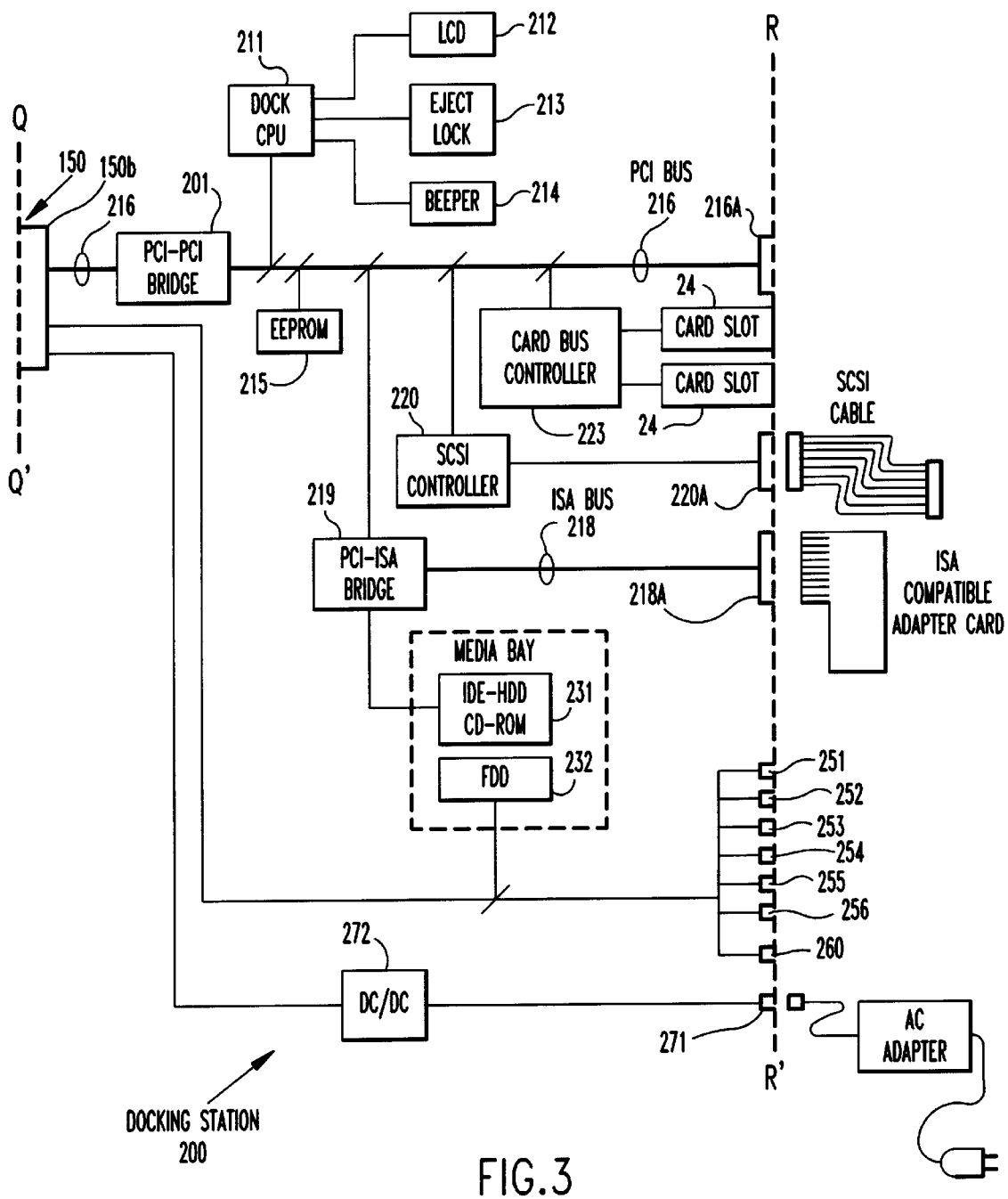
FIG. 3 is a schematic block diagram of the docking station.

FIG. 3 is a schematic block diagram showing a hardware configuration of the docking station 200 proposed for implementation of this invention. The docking station 200 is provided with a docking connector 150b which matches the connector 150a of the computer 100 unit in electrical and mechanical specifications and is adapted to collectively receive a PCI bus signal and a port signal, etc., from the computer 100 unit via the connectors 150a, 150b. The connector 150b is connected to the PCI bus 16 which is provided with a PCI-PCI bridge 201. The bridge 201 connects a PCI bus 216 to the PCI bus 16 in the primary side via the connector 150. A primary functions of the bridge 201 includes establishing a transfer path between the PCI buses in transferring data between a master device on the PCI bus 216 and a target device on the PCI bus 16, such as receiving a request from the master device to become a slave on the PCI bus 16 for temporarily storing transferred data in a buffer, and acquiring ownership of the PCI bus 16 for transferring data to the target device from the buffer. The master device is a device which can acquire the ownership of a bus so as to be able to execute a specific task while the target device is a device which can execute a task requested by the master device. Both of them are PCI devices connected to the PCI bus.

A CPU in the docking station side (DockCPU) 211 is a main controller for controlling the operation of each part in the docking station 200. The DockCPU 211 has a RAM used as a working area and a ROM for storing an execution program code (firmware) and the like (not shown) installed therein. The DockCPU 211 also controls an LCD indicator 212 for displaying the status of the docking station 200, the operation of an eject lock 213 for mechanically inhibiting removal of the computer 100 unit, and the operation of a beeper 214 for generating an alarm sound relating to operations. When viewed from the computer 100 unit (i.e., CPU 11), the DockCPU 211 is one of the peripheral devices connected to the bus and has an I/O register which is I/O accessible installed therein. The DockCPU 211 is fed by an auxiliary power source even when the computer 100 and the docking station 200 is powered off. An EEPROM 215 is a rewritable nonvolatile memory. The EEPROM 215 is used for saving a small amount of data necessary for security in coupling/separating the computer 100 unit and compensation of the operation of the system, such as a manufacturing number of the docking station 200, a user password and system configuration information. The stored content of the EEPROM 215 can be referred to from the side of the DockCPU 211 and the computer 100 unit.

A DC/DC converter 272 is a device for stepping down and stabilizing an external DC voltage inputted via a DC inlet 271 to distribute a power in the docking station 200 and the computer 100 unit side. An AC adapter for converting an AC voltage of a commercial power supply to a DC voltage is attached to the DC inlet 271. Port signals collectively received along with a PCI bus signal via the docking connector 150 branch to the CRT port 251, the line output terminal 252, the external keyboard port 253, the external mouse port 254, the parallel port 255, the serial port 256, and the MIDI port 260. The FDD 232 is connected to a FDD bus line. Devices requiring a relatively high speed data transfer, such as a SCSI (Small Computer System Interface) controller 220 and a card bus controller 223 are connected to the secondary side of the PCI bus 216 which is expanded in the docking station 200 side. The SCSI controller 220 is a special purpose controller for a protocol conversion between PCI and SCSI. A SCSI bus comes out of the docking station 200 at an SCSI port 220A. SCSI external devices are daisy chain connected to the SCSI port 220A by an SCSI cable. Examples of the SCSI devices include an HDD, an MO drive, a printer and a scanner, etc.

The card bus controller 223 is a special purpose controller for coupling a PCI bus signal directly to the card slot 24 in the manner similar to the above described hardware component 23. One or more PCI bus slots 216A are provided at the end of the secondary side of the PCI bus 216. A PCI compatible expansion adapter card can be attached to the PCI bus slot 216A. The docking station 200 is also provided with a secondary side ISA bus 218 which is interconnected to the secondary side PCI bus 216 by the PCI-ISA bridge 219. The significance of providing the secondary side ISA bus 218 lies in inheritance of a rich ISA legacy. The configuration of the bridge 219 is substantially same as the previously described hardware component 18. The bridge circuit 219 includes an IDE interface which allows an IDE device 231 such as an HDD and a CD-ROM drive to be connected. One or more ISA bus slots 218A are provided at the end of the secondary side of the ISA bus 218. An ISA compatible expansion adapter card can be attached to the ISA bus slot 218A.

Signal List of PCI Devices

FIG. 4 is a signal list of the PCI bus prescribed in the PCI local bus specification. Forty-nine (49) pins for required signals are shown in the left side of the PCI device while 46 pins for optional signals are shown in the right side. The symbol "#" following the name of the signals means that the signal is active when it is low, while absence of the symbol "#" means that the signal is active when it is high. A line entering the PCI device which has bi-directional arrow heads as seen in signals AD[31::00] and PAR means that data is transferred bi-directionally between a master device and a target device while a signal line having a unidirectional arrowhead such as REQ# and GNT#, etc., means that a signal is transferred unidirectionally in a master device or a target device. Each signal is now described briefly hereunder.

AD[31::00] is an address and data signal of 32 bits in which an address signal and a data signal are multiplexed on the same bus line. A single bus transaction comprises a single address phase and one or more data phases following thereto. C/BE[3::0]# is a 4 bits bus command and a byte enable signal which are multiplexed on a same bus line. C/BE[3::0]# is used in a bus command in the address phase and used for byte enable in the data phase. PAR is a 1 bit parity signal and applied to the 16 bits signal of AD[31::00] and C/BE[3::0].

FRAME# is a 1 bit cycle frame signal and generated by a current master device acquiring the ownership of a bus for indicating the start and continuance of an access. FRAME# is asserted at the start time of a transaction and continues to be asserted during the time when a data transfer continues. When FRAME# is de-asserted, the transaction is in a state where it is in the final data phase or has been completed. TRDY# is a 1 bit target ready signal and indicates that the target device can end the current data phase. IRDY# is a 1 bit initiator ready signal and indicates that an initiator or a master device can end the current data phase. STOP# is a 1 bit stop signal and indicates that the current target device requests a master device to stop the current transaction. DEVSEL# is a 1 bit device select signal and, when DEVSEL# of a device is in an active state, that device decodes the address as a target of the current access. IDSEL is a 1 bit initialization device select signal and is used for chip selection during read and write transactions of a configuration.

PERR# is a 1 bit parity error signal and used for a report of a data parity error occurring during all PCI transactions excluding a special bus cycle. SERR# is a 1 bit system error signal and used for a report of an address parity error and a data parity error in a special cycle command. REQ# is a 1 bit request signal and used to notify an arbiter that the device requests the ownership of the bus. GNT# is a 1 bit ground signal and used to notify the device requesting the ownership of the bus that the ownership of the bus is granted. CLK is a 1 bit clock signal supplied to all PCI devices and used to adjust the timing of all PCI transactions. RST# is a reset signal and used to restore a specific register, sequencer and a signal of the PCI to a predetermined state.

AD[63::32] is an address and data signal of 32 bits in which an address signal and a data signal are multiplexed on a same bus line. C/BE[7::4]# is a bus command and byte enable signal comprising 4 bits and both signals are multiplexed on a same pin. PAR64 is a 1 bit upper double word parity error signal and used for an error report of the bit signals of AD[63::32] and C/BE[7::4]#. REQ64# is a 64 bits transfer signal comprising 1 bit and indicates that data transfer of 64 bits is requested when it is activated by the current bus master. ACK64# is a 64 bits transfer acknowledge signal comprising 1 bit and indicates that the target transfers data of 64 bits when it is activated by a device which decoded the address as a target of the current access. LOCK# is a lock signal comprising 1 bit for interface control and used to inhibit other master device from accessing to the target device when a master device accesses to a target device. INTA#, INTB#, INTC#, INTD# are used when a device generates an interrupt signal.

Signal Having a Turn Around Cycle in a Cycle Operation

In the PCI bus standard, the turn around cycle is generated at a specific timing depending on the kind of PCI signals. For example, the turn around cycle is generated at the positive edge of the first CLK after entering the address phase for signals of IRDY#, TRDY#, DEVSEL#, STOP#, ACK#, PAR, LOCK.

For signals FRAME#, REQ64#, IDSEL, C/BE[3::0], C/BE[7::4], AD[31::00], AD[63::32], the turn around cycle is generated using an idle state occurring during a transaction. The "idle state" refers to a state in which both FRAME# and IRDY# are deasserted and is generated at the positive edge of the first CLK occurring after the data phase ends. Further, the turn around cycle of PERR# is generated at the 4th CLK from the last data phase.

An example in which a turn around cycle is generated in a PCI signal in PCI bus transactions is shown in FIG. 5 to FIG. 8. In FIG. 5 to FIG. 8, a symbol of a pair of arrow heads each pointing the tail of the other indicates a turn around cycle. FIG. 5 shows a basic read operation of a PCI bus which starts with an address phase where FRAME# is asserted first. FIG. 5 shows that a turn around cycle is generated at the positive edge of the second CLK which corresponds to the first CLK after IRDY#, TRDY#, DEVSEL# signals enter the address phase. The turn around cycle occurring at AD in the first data phase is not used in this invention. FIG. 5 further shows that both FRAME# and IRDY# are de-asserted resulting in an idle state, and FRAME#, AD, C/BE# signals become the turn around cycle at the positive edge of the 9th CLK which corresponds to the first CLK occurring after the data phase ends.

FIG. 6 shows a parity operation of a PCI bus. In the parity operation, it is determined whether or not a master device has addressed a predetermined target device for each transaction, and whether or not data has been precisely transferred between the master device and the target device. In FIG. 6, a turn around cycle is generated in PAR at the positive edge of the 6th CLK after entering the address phase. In the PCI standard, it is prescribed that the turn around cycle of PERR# occurs in the 4th CLK from the last data phase. FIG. 6 shows that the turn around cycle occurs in PERR# at the positive edge of the 8th CLK which is the 4th CLK from the last data phase which occurred in the 4th CLK.

FIG. 7 shows a basic write operation of a PCI bus. In the similar manner to the read operation of FIG. 5, the turn around cycle is generated in IRDY#, TRDY#, DEVSEL# signals in the first CLK of the address phase and in FRAME#, AD, C/BE# signals in the idle state. FIG. 8 shows a retry operation of a PCI bus. "Retry" refers to temporarily ending a transaction before data is transferred when a target device is busy. FIG. 8 shows a turn around cycle of STOP# occurring in the first CLK of the address phase.

Signals Which do not Have a Turn Around Cycle in a Cycle Operation

Bus lines of PCI signals having a turn around cycle are shared by a plurality of devices, and a driver of a device driving a signal and a receiver of a device receiving a signal are determined for each bus cycle. However, bus lines of REQ#, GNT#, CLK signals are provided for respective devices with a driver being fixedly associated to a receiver with 1 to 1 relationship. For example, CLK is supplied to each PCI device behaving as a receiver from a clock generator behaving as a driver through its unique bus line.

In such bus line which is provided uniquely for a device, any noise riding the bus line when it is connected to other bus line will not affect other devices which are in a cycle operation because the bus line is not shared by a plurality of devices, and there is no need to consider the timing of connection in connecting a PCI bus which is in a cycle operation. Further, because these signals are generated asynchronously with the bus cycle, the bus line may be connected and disconnected independently from the bus cycle.

Further, SERR#, INTA#, INTB#, INTC#, INTD# signals are a signal of an open drain type and each driver of the PCI device is connected to each bus line by a wired OR circuit with respect to each of these signals. The open drain signal is based on an assumption that each driver drives a signal asynchronously and does not give an effect of a noise to other devices which are in a cycle operation even if a device is connected to the bus line asynchronously with the bus cycle.

Further, because RST# only sends a signal unidirectionally from the computer side to the side of the docking station, it will be enough to arrange so that a noise generating at the connecting portion is not transferred to the computer side in executing hot docking/undocking of the RST# bus line. The above described REQ#, GNT#, CLK, SERR#, INTA#, INTB#, INTC#, INTD#, RST# signals do not have a turn around cycle in the cycle operation of the PCI bus as obviously seen from the nature of these signals.

Circuit Configuration of Hot Docking/Undocking of PCI Bus

Figure 9:
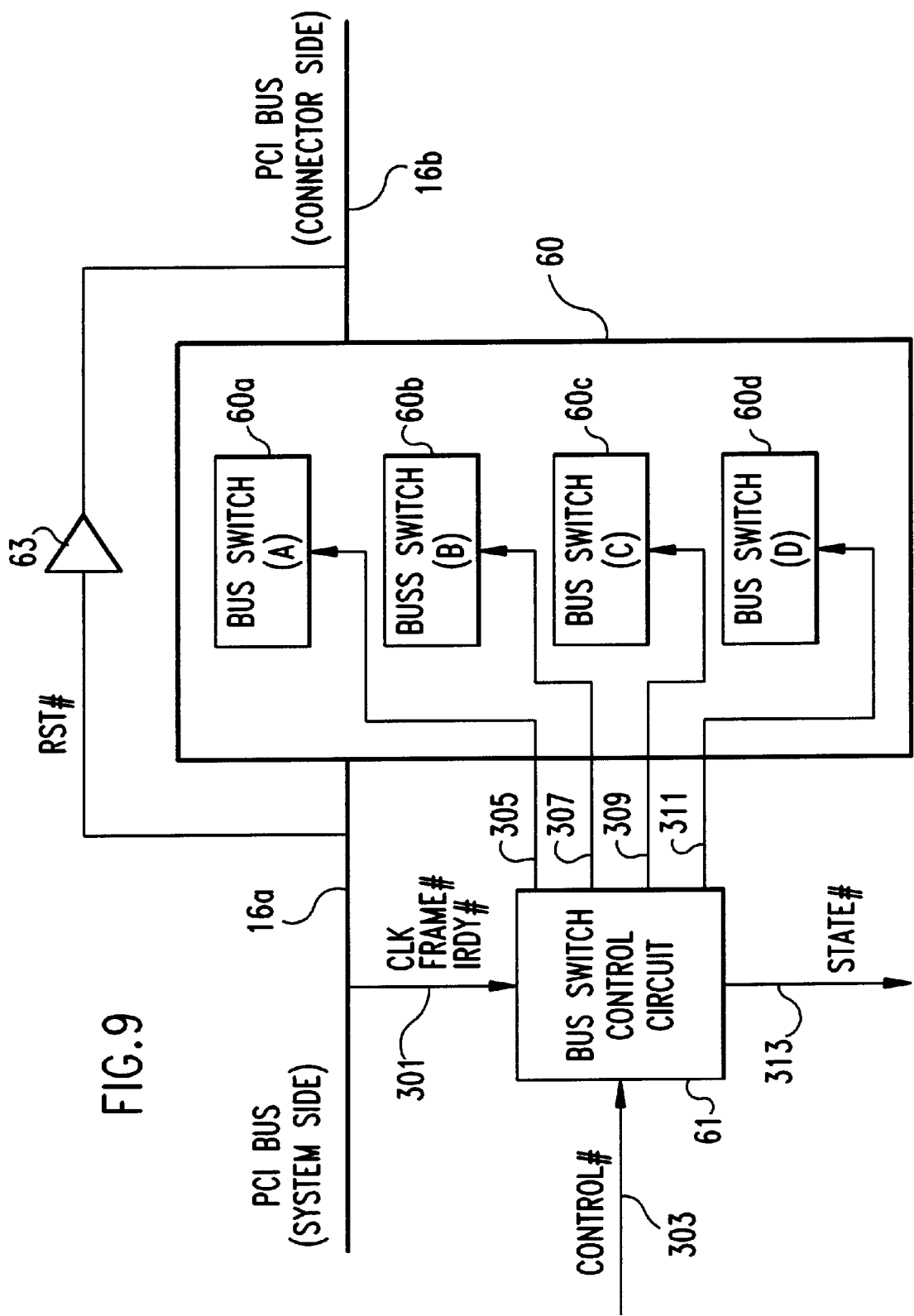
FIG. 9 is a block diagram showing a basic configuration of hot docking/undocking of the PCI bus.

FIG. 9 is a block diagram showing a basic hardware configuration of hot docking/undocking of an embodiment of this invention which is used in the computer described with reference to FIG. 2. A PCI bus 16*a* (internal side of the system) and a PCI bus 16*b* (connector side) are connected to the primary side and the secondary side of the bus switch 60. The PCI buses 16*a* and 16*b* have a plurality of bus lines used for transferring the signals described in FIG. 4. The bus switch 60 comprises 4 components including a bus switch (A) 60*a*, a bus switch (B) 60*b*, a bus switch (C) 60*c*, and a bus switch (D) 60*d*. The bus lines which transfers CLK, FRAME# and IRDY# signals in the PCI bus 16*a* are connected to the bus switch control circuit 61 via the line 301. The bus line which transfers RST# signal in the PCI bus 16*a* is connected to the bus line which transfers RST# signal of the PCI bus 16*b* via the buffer 63, A line 303 which transfers a bus connection signal CONTROL# for controlling execution of hot docking/undocking is connected between the power source controller 38 (FIG. 2) and the bus switch control circuit 61. Bus lines 305, 307, 309, 311 which transfer a bus switch control signals for controlling the bus switch 60, ENABLE-A# ENABLE-B#, ENABLE-C#, ENABLE-D# are connected to a bus switch (A) 60*a*, a bus switch (B) 60*b*, a bus switch (C) 60*c*, a bus switch (D) 60*d*, respectively. Further, a line 313 which transfers a bus connection status signal STATE# is connected from the bus switch control circuit 61 to the power source controller 38. The buffer 63 is independent from the control by the bus switch control circuit.

Configuration of Bus Switch Control Circuit

Figure 10:
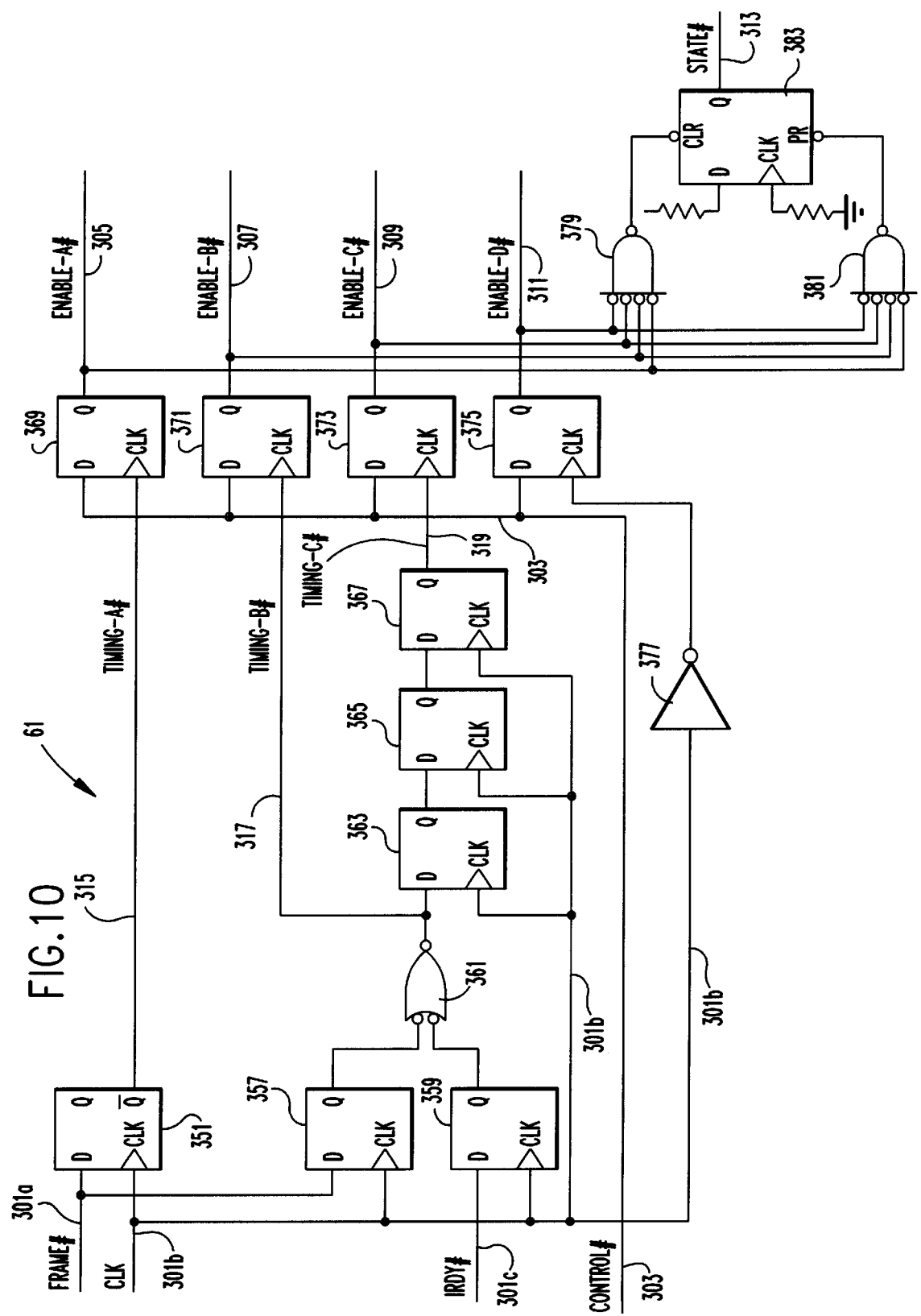
FIG. 10 is a block diagram of the bus switch control circuit 61.

FIG. 10 is a block diagram showing an embodiment of the bus switch control circuit 61. A FRAME# line 301*a* is connected to the D input of a D flip flop 351, a CLK line 301*b* is connected to the edge trigger CLK input, and a line 315 is connected to the inverted Q output. The D flip flop 351 generates a timing signal TIMING-A# having a positive edge at the timing of a turn around cycle occurring at the first CLK after entering an address phase to supply it to the edge trigger CLK input of a D flip flop 369 via the line 315. A line which transfers the bus control signal CONTROL# is connected to the D input of the D flip flop 369. The bus switch control signal ENABLE-A# is outputted from the Q output of the D flip flop 369 via the line 305.

The FRAME# bus line 301*a* is connected to the D input of a D flip flop 357, the CLK bus line 301*b* is connected to the edge trigger CLK input, and the Q output is connected to one input of an AND gate 361. The IRDY# bus line 301*c* is connected to the D input of a D flip flop 359, the CLK bus line 301*b* is connected to the edge trigger CLK input, and the Q output is connected to the other input of the AND gate 361. The AND gate 361 generates a TIMING-B# having a positive edge at the timing of a turn around cycle occurring at the positive edge of the first CLK after the data phase has ended and supplies it to the edge trigger CLK input of a D flip flop 371 via a line 317. The line 303 which transfers a bus control signal CONTROL# is connected to the D input of the D flip flop 371. A bus switch control signal ENABLE-B# is outputted from the Q output of the D flip flop 371 via a line 307.

The output of the AND gate 361 is further connected to the D input of a D flip flop 363 and outputted to a line 319 via a D flip flop 365 and a D flip flop 367. The line 301*b* is connected to the respective edge trigger CLK inputs of the D flip flops 363, 365, 367 to supply CLK. A timing signal TIMING-C# of a turn around cycle occurring at the positive edge of the 4th CLK after the data phase has ended is generated in the line 319 and supplied to the edge trigger CLK input of a D flip flop 373. The line 303 which transfers a bus control signal CONTROL# is connected to the D input of the D flip flop 373. A bus switch control signal ENABLE-C# is outputted from the Q output of the D flip flop 373 via the line 309, The line 303 which transfers a bus control signal CONTROL# is connected to the D input of a D flip flop 375. The CLK bus line 301*b* is connected to the input of an inverter 377 the output of which is connected to the edge trigger CLK input of the D flip flop 375. A bus switch control signal ENABLE-D# is outputted from the Q output of the D flip flop 375 via the line 311. The lines 305, 307, 309, 311 are connected to the inputs of an OR gate 379 and a NAND gate 381. The outputs of the OR gate 379 and the NAND gate 381 are connected to the clear input and the preset input PR of a D flip flop 383, respectively. The D input of the D flip flop 383 is maintained in a high level while the CLK input is maintained in a low level to output a bus connection status signal STATE# via a line 313.

Operation of Bus Switch Control Circuit

Figure 11:
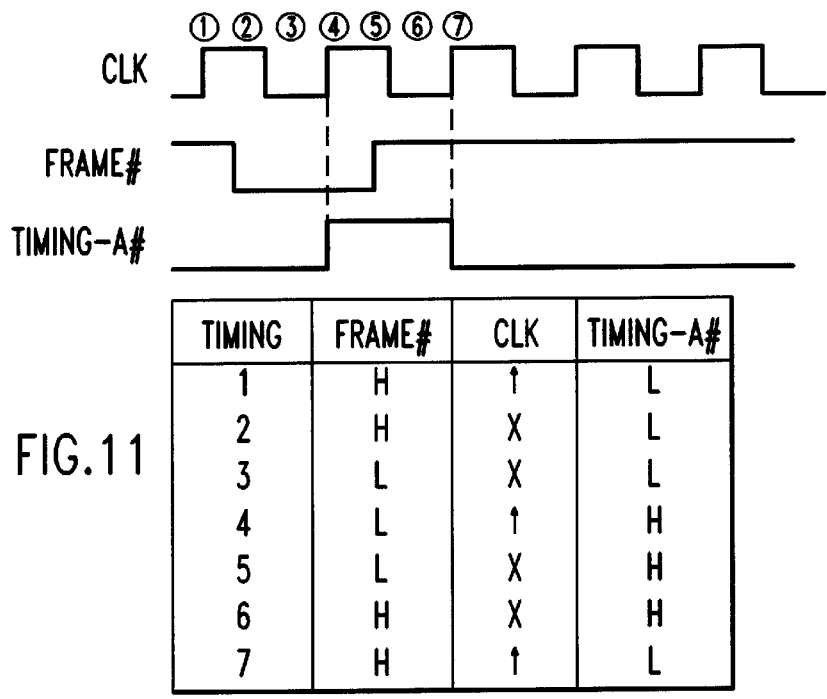
FIG. 11 is a truth table of a circuit which generates TIMING-A#.

The operation of the bus switch control circuit shown in FIG. 10 is now described. TIMING-A# is generated from FRAME# and CLK signals by the D flip flop 351. A timing chart, along with a truth table of a circuit for generating TIMING-A#, is shown in FIG. 11. As seen in the truth table, TIMING-A# is in a low level when FRAME# continues to be in a high level (timing 1, 2), continues to be in a low level until clocked at the positive edge of CLK even when FRAME# becomes a low level (timing 3), and becomes a high level when FRAME# of a low level is clocked at the positive edge of CLK (timing 4). TIMING-A# is maintained in a high level until FRAME# becomes a high level and clocked by CLK (timing 5, 6), and becomes a low level when FRAME# of a high level is clocked at the positive edge of CLK (timing 7). Accordingly, TIMING-A# has a positive edge which is in synchronism with the first CLK generated after FRAMES becomes a low level and the bus cycle enters an address phase, and becomes a low level at the positive edge of the next CLK so that it is in synchronism with the turn around cycle relating to IRDY#, TRDY#, DEVSEL#, STOP#, ACK#, PAR and LOCK signals.

Figure 12:
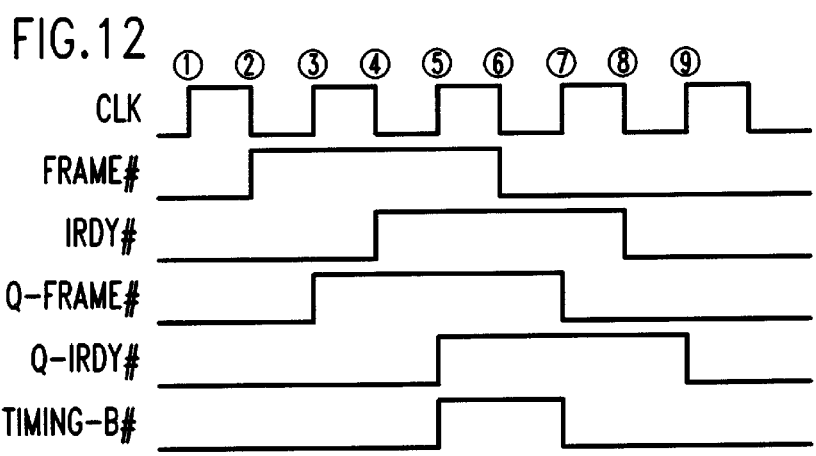
FIG. 12 is a truth table of a circuit which generates TIMING-B#.

TIMING-B# is generated from FRAMES, IRDY# and CLK signals by the D flip flops 357, 359 and the AND gate 361. A timing chart and a truth table of a circuit for generating TIMING-B# is shown in FIG. 12. As shown in FIG. 12, TIMING-B# is in a low level when either the output of the D flip flop 357 Q-FRAME# which is FRAME# clocked at the positive edge of CLK or the output of the D flip flop 361 Q-IRDY# which is FRAME# clocked at the positive edge of CLK is in a low level (timing 1–4), and becomes a high level when both of them are in a high level (timing 5–6). More specifically, TIMING-B# becomes a signal having a positive edge at the timing of the positive edge of the first CLK (timing 5) after both FRAME# and IRDY# become a high level (timing 4). Accordingly, TIMING-B# has a positive edge which is in synchronism with CLK at the timing when both FRAME# and IRDY# are de-asserted into an idle state and is in synchronism with the turn around cycle of FRAM#, REQ64#, C/BE[3::0], IDSEL#, C/BE[7::4], AD[31::00], AD[63::32] signals.

TIMING-C# is generated from TIMING-B# and CLK signals by a circuit which comprises 3 D flip flops 363, 365 and 367 connected in series. As seen from the drawing, TIMING-C# is generated 3 CLKs behind TIMING-B#. Accordingly, TIMING-C# is generated in the 4th CLK from the last data phase and will assert the timing of the turn around cycle of PERR#.

The operation of a part generating a bus switch control signal ENABLE-# is now described. ENABLE-A# is generated by TIMING-A# supplied to the edge trigger CLK input and CONTROL# supplied to the D input of the D flip flop 369. As obvious from the operation of a D flip flop, ENABLE-A# becomes a low level at the positive edge of the first TIMING-A# after CONTROL# becomes a low level and is maintained to be in the low level while CONTROL# is in the low level. ENABLE-A# then becomes a high level at the positive edge of the first TIMING-A# after CONTROL# becomes a high level.

ENABLE-B# and ENABLE-C# are similarly generated according to the relationship between TIMING-B#/TIMING-C# and CONTROL#. As to ENABLE-D#, CLK goes through an inverter 377 to the edge trigger CLK input of a D flip flop 375. This corresponds to clocking CONTROLS at the negative edge of CLK. ENABLE-D# is synchronized with the negative edge of CLK so as to minimize the influence given when the operation state of the bus changes because a signal is detected at the positive edge in the PCI bus.

The operation of a part which outputs STATE# to the line 313 is next described. STATE# is generated by an OR gate 379, a NAND gate 381 and a D flip flop 383 which receive ENABLE-A#, ENABLE-B#, ENABLE-C#, ENABLE-D# signals as inputs. When all ENABLE-# signals become active low, a low level signal is supplied to CLR to cause the D flip flop 383 to be cleared and output a low level signal on the line 313. When all ENABLE-# signals become inactive high, a low level signal is supplied to PR to cause the D flip flop 383 to be reset and output a high level signal on the line 313. During a transient period when all ENABLE# signals are not high or low, inputs to CLR and PR are high and the previous state is maintained.

Bus Switch

Figure 13:
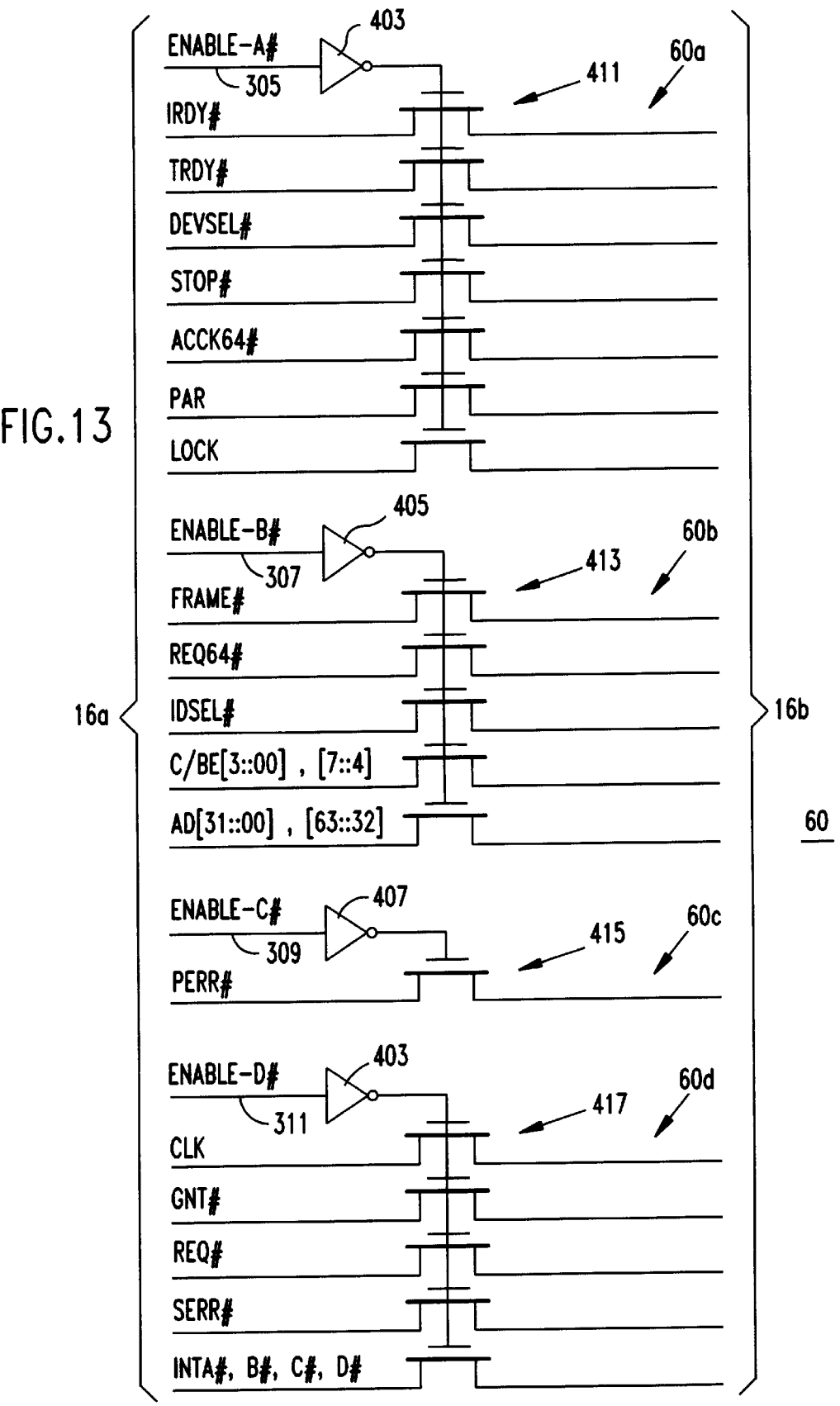
FIG. 13 is a schematic diagram showing an embodiment of a bus switch.
Figure 18:
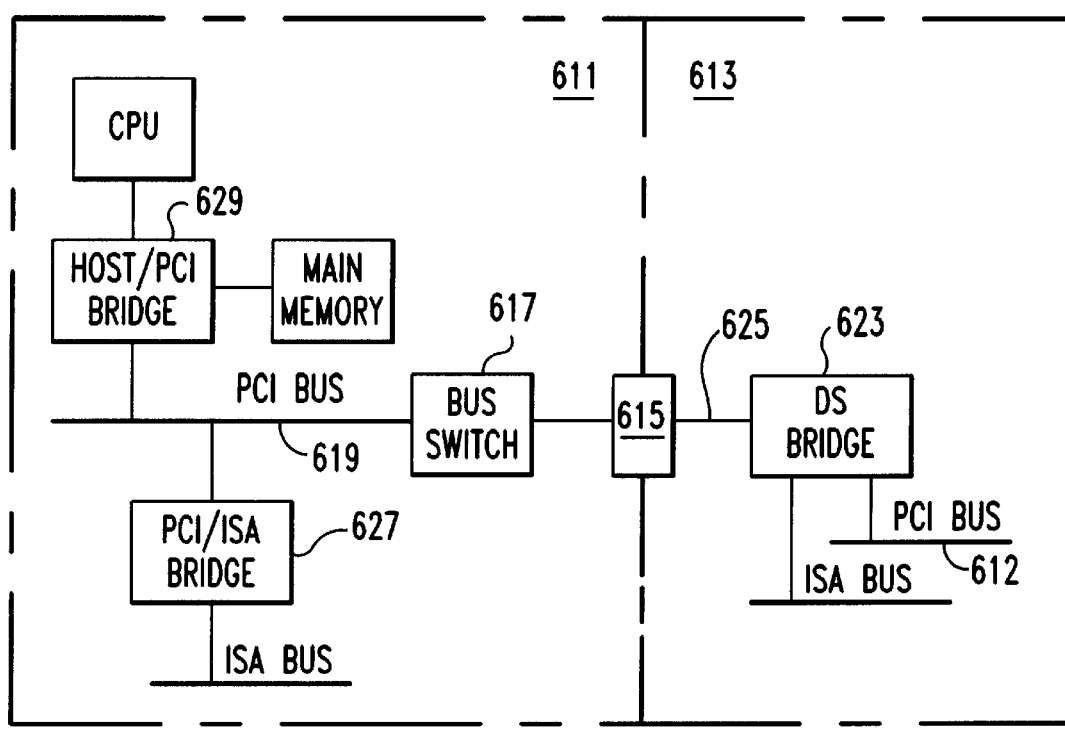
FIG. 18 is a schematic block diagram showing a prior art.
Figure 19:
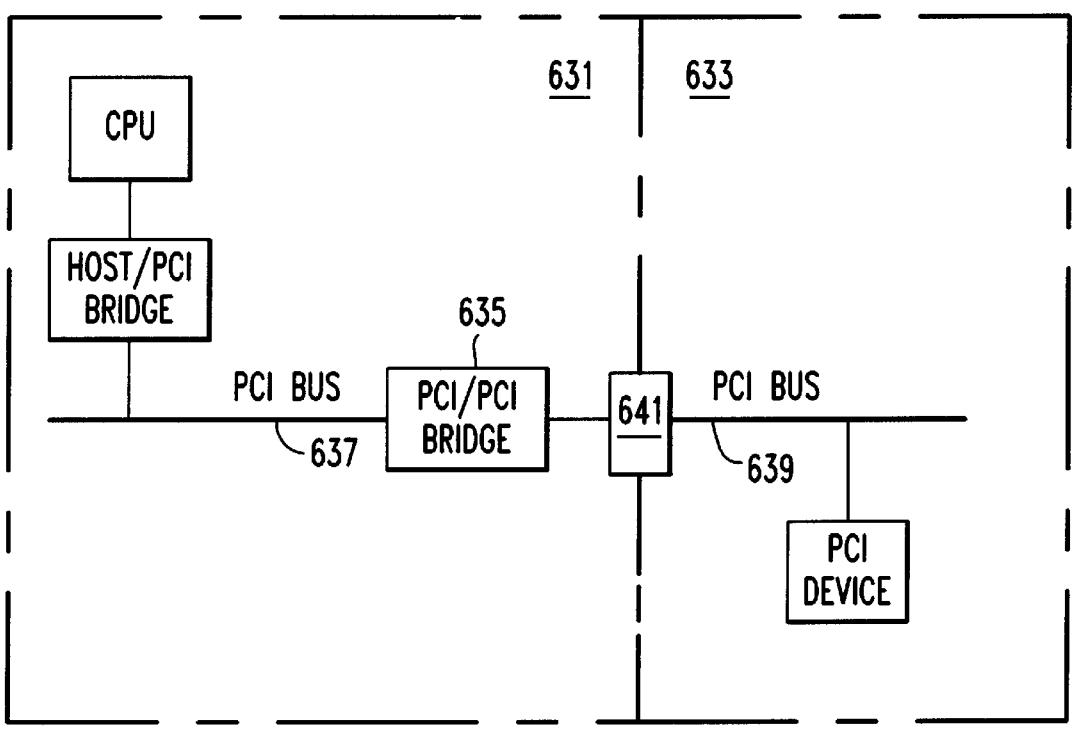
FIG. 19 is a schematic block diagram showing a prior art.

FIG. 13 shows an embodiment of the bus switch 60. The bus switch 60 comprises 4 components including a bus switch 60a, 60b, 60c, 60d respectively for different kind of the related bus switch control signal. Each component of the bus switch includes one or more N type FETs 411, 413, 415, 417 as a switching device. Any kind of device which has a connection resistance no greater than 50 milli-ohm and a suitable directionality depending on the kind of a signal, and can be controlled by an external signal may be used as a switching device of this invention.

In the component 60a, the line 305 which transfers ENABLE-A# is connected to an inverter 403 and the signal inverted by the inverter 403 is connected to all gates of the FETs comprising the bus switch 60a. The switching devices 411 of the component 60a are inserted to the bus lines of IRDY#, TRDY#, DEVSEL#, STOP#, ACK#, PAR, LOCK. As described previously, these signals are in a group of signals in which a turn around cycle is generated at the positive edge of the first CLK of the address phase and the timing of the turn around cycle is asserted by TIMING-A#. ENABLE-A# is a low active signal and, when it becomes a low level by being inverted by the inverter 403, all the switching devices 411 of the component 60a are turned on.

The switching devices 413 of the component 60b are inserted in the bus lines of FRAME#, REQ64#, IDSEL, C/BE[3::0], C/BE[7::4], AD[31::00], AD[63::32]. While a bus line comprising a plurality of bits is represented by a single bit line for the purpose of simplifying the drawing in FIG. 13, a switching device is inserted in each bus line. As described previously, these signals are in a group of signals in which a turn around cycle is generated in an idle state and the timing of the turn around cycle is asserted by TIMING-B#. When ENABLE-B# becomes low level, all the switching devices 413 of the component 60b are turned on.

The switching device 415 of the component 60c is inserted in the bus line of PERR#. PERR# is a signal in which a turn around cycle is generated in the 4th CLK from the last data phase and the timing of the turn around cycle is asserted by TIMING-C#. When ENABLE-C# becomes a low level, the switching device 415 is turned on.

The switching devices 417 of the component 60d are inserted in the bus lines of CLK, GNT#, REQ#, SERR#, INTA#, INTB#, INTC#, INTD#. As described previously, these signals do not contain a turn around cycle and are signals unique to devices or signals which are generated asynchronously with the bus cycle. Because they can be connected without consideration given to the state of the bus cycle, it is enough to connect simply at any timing of CLK. When TIMING-D# generated at an arbitrary timing of CLK becomes a low level, all the switching devices 417 of the component 60d are turned on.

Sequence of PCI bus Hot Docking/Undocking

The operation in hot docking/undocking a computer to and from the docking station is now described. The sequence in which each bus line of the computer is connected to or disconnected from the bus line of the docking station by the operation of the bus switch in this invention depends on the state of the bus cycle at the time when the bus connection signal CONTROL# is asserted or de-asserted. This is because the timing of generation of a turn around cycle depends on the bus cycle and a turn around cycle occurs at a different timing in the bus cycle for a different kind of a signal. Accordingly, the sequence of connecting the bus line described hereunder is an example and this invention is not limited to such sequence.

FIG. 14 shows an example of a timing chart of a PCI signal for a case where the computer 100 (FIGS. 1, 2) is hot docked to the docking station 200 (FIGS. 1, 3). FIG. 15 shows an example of a flow chart of a procedure for connecting the bus. The personal computer 100 is assumed to be driven by an internally installed battery and the PCI bus 16 is assumed to execute a bus cycle for transferring a signal between PCI devices. The bus connection signal CONTROL# is de-asserted in a high level, all the bus switch control signals ENABLE-□# are de-asserted in a high level, and all the bus switches 60 are turned off so that a PCI signal does not appear in the PCI bus line 16b of the connector side. When the computer 100 is mounted to the docking station 200 and the connectors 150a and 150b are electrically connected to each other in step 501, a hardware detects it and generates a signal. The hardware may be a switch provided in the computer unit or a device of the docking station side having a line which is connected to the computer via the connector 150. The signal is sent to the power source controller 38 which then issues an SMI. The device issuing the SMI is not limited to the power source controller and may be another device having an equivalent function.

In step 503, the BIOS detects the SMI and instructs the power source controller to assert the bus connection signal CONTROL# in a low level. The power source controller sends CONTROL# of a low level to the bus switch control circuit 61. The device which the BIOS instructs to assert a CONTROL# signal is not limited to the power source controller and may be another device having a similar function. In FIG. 14, CONTROL# is in active low at the positive edge of the first CLK. At this point of time, the PCI bus 16 executes a bus cycle according to the transaction of the computer while the bus switch control circuit 61 monitors CLK, FRAME#, and IRDY# signals among the signals on the PCI bus. FRAME# becomes a low level during the first CLK and the start of a bus transaction is declared to start an address phase.

In step 505, ENABLE-A# becomes a low level at the positive edge of the second CLK, which corresponds to the first CLK after entering the address phase, to turn on all the switching devices 411 of the bus switch 60a (FIG. 13). In step 507, ENABLE-D# becomes a low level at the negative edge of the second CLK, which corresponds to the first CLK after CONTROL# becomes a low level, to turn on all the switching devices 417 of the bus switch 60d. In step 509, because both the FRAME# and the IRDY# are in the idle state of a high level at the time when the positive edge of the 8th CLK is generated, ENABLE-B# becomes a low level and all the switching devices 413 of the bus switch 60d are turned on.

In step 511, FRAME# becomes a high level at the 7th CLK and the data phase ends. ENABLE-C# then becomes a low level at the positive edge of the 11th CLK which is 4 positive edges of CLKs after the 7th CLK and the switching device 415 of the bus switch 60c is turned on. In step 513, STATE# becomes a low level indicating that all bus lines have been connected and a computer user or the system can be notified of STATE# via the power source controller 38 by a well known method.

It will be clear from the above description that bus lines which can be affected by a noise are connected at a time coincident with respective turnaround cycles, while other bus lines are connected without considering the bus cycle.

FIG. 16 shows an example of a timing chart of a PCI signal in the case where a computer is hot undocked from the docking station. FIG. 17 shows an example of a flow chart of a procedure for disconnecting the bus. The procedure for undocking is substantially opposite to the procedure for docking, so a detailed description is omitted. In step 521, a signal of the start of undocking operation is sent to the power source controller 38 by depressing an eject button (not shown) provided in the docking station before undocking the active computer from the docking station. Thereafter, the bus switch control circuit successively disconnects the bus lines by the operation of the bus switches, which is opposite to the operation in docking from step 523 to step 531. In step 533, the user can remove the computer from the docking station by being notified of a high level STATE# which indicates that all bus lines have been disconnected by a well known method.

This invention provides an apparatus and a method of hot docking/undocking between a bus line such as a PCI bus which interconnects devices comprising a computer system and peripheral devices of the computer by adding a simple hardware to the computer.

This invention provides an apparatus and a method for monitoring a turn around cycle of a PCI bus line to hot dock/undock to and from a bus line at a time when noise will not affect a bus cycle when docked or undocked.

This invention provides a connecting apparatus and method for hot docking/undocking in which there is no need to provide a device for acquiring the ownership of a bus for docking/undocking.

This invention provides a connecting apparatus and method for hot docking/undocking in which there is no need to provide a PCI-PCI bridge in a computer for hot docking/undocking.

This invention provides a connecting apparatus and method for hot docking/undocking which does not require a special function in a hot docked/undocked peripheral device.

While the invention has been described with reference to several preferred embodiments, it will be apparent to one having skill in the relevant art that modifications and adaptations may be made without departing from the spirit and scope of the appended claims.

Having thus described our invention, what the inventors wish to obtain patent protection on is the following:

1. A connecting apparatus for electrically connecting a bus line which interconnects devices comprising a computer system to peripheral devices of said computer system, said apparatus comprising;
  a bus switch control circuit for detecting a signal on said bus line and for generating a bus switch control signal which responds to a turn around cycle, and
  a switching device dividing said bus line into a first side connecting to said computer system and a second side connecting to said peripheral devices, said switching device having a bus switch responding to said bus switch control signal to perform connect and disconnect operations.

2. The connecting apparatus of claim 1 wherein said bus line comprises a PCI bus line.

3. The connecting apparatus of claim 2 wherein said bus switch control signal comprises an address phase bus switch control signal responding to the turn around cycle related to the start of an address phase.

4. The connecting apparatus of claim 2 wherein said bus switch control signal comprises an idle state bus switch control signal responding to the turn around cycle related to an idle state.

5. The connecting apparatus of claim 3 wherein said bus switch control signal additionally comprises an idle state bus switch control signal responding to the turn around cycle related to an idle state.

6. The connecting apparatus of claim 2 wherein the PCI bus line comprises a clock signal and wherein said bus switch control signal comprises a timing bus switch control signal responding to the timing of the clock of said PCI bus line.

7. The connecting apparatus of claim 3 wherein the PCI bus line comprises a clock signal and wherein said bus switch control signal additionally comprises a timing bus switch control signal responding to the timing of the clock of said PCI bus line.

8. The connecting apparatus of claim 4 wherein the PCI bus line comprises a clock signal and wherein said bus switch control signal additionally comprises a timing bus switch control signal responding to the timing of the clock of said PCI bus line.

9. The connecting apparatus of claim 2 in which said PCI bus line signals detected by said bus switch control signal include FRAME#, IRDY#, and CLK signals.

10. The connecting apparatus of claim 2 in which switching devices included in said bus switch constitute a group comprising at least one switching device inserted in at least one PCI bus line which transfer a signal having a turn around cycle, and wherein the switching devices included in said group integrally operate to connect and disconnect in response to said bus switch control signal.

11. The connecting apparatus of claim 2 in which switching devices included in said bus switch constitute a group comprising at least one switching device inserted in at least one PCI bus line which transfer a signal having a turn around cycle and another group comprising at least one switching device inserted in at least one PCI bus line which transfers a signal not having a turn around cycles said bus switch control signal being supplied to respective groups at a differing timing, and wherein at least one switching device included in said group integrally operates to connect and disconnect in response to said bus switch control signal.

12. A connecting apparatus for electrically connecting a PCI bus line which interconnects devices comprising a computer system to peripheral devices of said computer system, said apparatus comprising;
a bus switch control circuit for detecting a signal on said PCI bus line to generate a first bus switch control signal which responds to a turn around cycle related to the start of an address phase, a second bus switch control signal which responds to a turn around cycle related to an idle state, and a third bus switch control signal which responds to the timing of CLK, and
a bus switch comprising a first group of at least one switching device inserted in a PCI bus line which transfers a signal having a turn around cycle related to the start of an address phase, a second group of at least one switching device inserted in a PCI bus line which transfers a signal having a turn around cycle related to the idle state, and a third group of at least one switching device inserted in a PCI bus line which transfers a signal not having a turn around cycle, each switching device included in said first group responding to said first bus switch control signal to integrally perform connect and disconnect operations, each switching device included in said second group responding to said second bus switch control signal to integrally perform connect and disconnect operations, and each switching device included in said third group responding to said third bus switch control signal to integrally perform connect and disconnect operations.

13. A computer having a connecting apparatus for electrically connecting a bus line which interconnects devices comprising a computer system to peripheral devices of said computer system, said apparatus comprising;
a bus switch control circuit for detecting a signal on said bus line to generate a bus switch control signal which responds to a turn around cycle, and
a switching device dividing said bus line into the side of said computer system and the side of said peripheral devices, said switching device having a bus switch responding to said bus switch control signal to perform a connect and disconnect operations.

14. The computer of claim 13 wherein said bus line comprises a PCI bus line.

15. The computer of claim 14 wherein said bus switch control signal includes an address phase bus switch control signal responding to the turn around cycle related to the start of an address phase.

16. The computer of claim 14 wherein said bus switch control signal comprises an idle state bus switch control signal responding to the turn around cycle related to an idle state.

17. The computer of claim 15 wherein said bus switch control signal additionally comprises an idle state bus switch control signal responding to the turn around cycle related to an idle state.

18. The computer of claim 14 wherein the PCI bus has a clock signal and wherein said bus switch control signal comprises a clock bus switch control signal responding to the timing of the clock of said PCI bus line.

19. The computer of claim 15 wherein the PCI bus has a clock signal and wherein said bus switch control signal additionally comprises a clock bus switch control signal responding to the timing of the clock of said PCI bus line.

20. The computer of claim 16 wherein the PCI bus has a clock signal and wherein said bus switch control signal additionally comprises a clock bus switch control signal responding to the timing of the clock of said PCI bus line.

21. The computer of claim 17 wherein the PCI bus has a clock signal and wherein said bus switch control signal additionally comprises a clock bus switch control signal responding to the timing of the clock of said PCI bus line.

22. The computer of claim 14 in which said PCI bus line signals detected by said bus switch control signal include FRAME#, IRDY#, and CLK signals.

23. The computer of claim 14 in which switching devices included in said bus switch constitute a group comprising at least one switching device inserted in at least one PCI bus line which transfers a signal having a turn around cycle, and the switching devices included in said group integrally operate to connect and disconnect in response to said bus switch control signal.

24. The computer of claim 14 in which switching devices included in said bus switch constitutes a group comprising at least one switching device inserted in at least one PCI bus line which transfers a signal having a turn around cycle and another group comprising at least one switching device inserted in at least one PCI bus line which transfers a signal not having a turn around cycle, said bus switch control signal being supplied to respective groups at a differing timing, and at least one switching device included in said group integrally operating to connect and disconnect in response to said bus switch control signal.

25. A computer having a connecting apparatus for electrically connecting a PCI bus line which interconnects devices comprising a computer system to peripheral devices of said computer system, said apparatus comprising;

a bus switch control circuit for detecting a signal on said PCI bus line to generate a first bus switch control signal which responds to a turn around cycle related to the start of an address phase, a second bus switch control signal which responds to a turn around cycle related to an idle state, and a third bus switch control signal which responds to the timing of CLK, and a bus switch comprising a first group of one or more switching devices inserted in a PCI bus line which transfer a signal having a turn around cycle related to the start of an address phase, a second group of one or more switching devices inserted in a PCI bus line which transfer a signal having a turn around cycle related to the idle state, and a third group of one or more switching devices inserted in a PCI bus line which transfer a signal not having a turn around cycle, each switching device included in said first group responding to said first bus switch control signal to integrally perform a connect or disconnect operation, each switching device included in said second group responding to said second bus switch control signal to integrally perform a connect or disconnect operation, and each switching device included in said third group responding to said third bus switch control signal to integrally perform a connect or disconnect operation.

26. A method for electrically connecting a bus line which interconnects devices comprising a computer system to peripheral devices of said computer system, said method comprising;

a step of detecting a signal on said bus line;

a step of generating a bus switch control signal which responds to a turn around cycle upon detection of the signal on the bus line, and a step of controlling connection of the side of said computer system and the side of said peripheral devices in said bus line in response to said bus switch control signal.

27. The method for electrically connecting of claim 26 wherein the bus line comprises a PCI bus line.

28. The method of claim 27 in which said bus switch control signal includes an first bus switch control signal responding to the turn around cycle related to the start of an address phase and a second bus switch control signal responding to the turn around cycle related to an idle state.

* * * * *